United States Patent
Wu

(10) Patent No.: US 12,388,535 B2
(45) Date of Patent: Aug. 12, 2025

(54) DATA PROCESSING DEVICE, DATA PROCESSING METHOD AND COMPUTER READABLE MEDIUM FOR TRANSMITTING A CARRIER SIGNAL

(71) Applicant: NEC Corporation, Tokyo (JP)

(72) Inventor: Mingqi Wu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 156 days.

(21) Appl. No.: 18/118,444

(22) Filed: Mar. 7, 2023

(65) Prior Publication Data

US 2023/0396338 A1  Dec. 7, 2023

(30) Foreign Application Priority Data

Jun. 3, 2022  (JP) .................. 2022-090556

(51) Int. Cl.
  *H04B 10/532* (2013.01)
  *H04B 10/50* (2013.01)
(52) U.S. Cl.
  CPC ......... *H04B 10/532* (2013.01); *H04B 10/503* (2013.01)
(58) Field of Classification Search
  CPC ............ H04B 10/532; H04B 10/503
  See application file for complete search history.

(56) References Cited

U.S. PATENT DOCUMENTS

| | | | | |
|---|---|---|---|---|
| 9,083,570 B2* | 7/2015 | Kan | .............. | H04B 10/613 |
| 9,755,763 B2* | 9/2017 | Jia | .............. | H04L 25/03261 |
| 11,012,187 B1* | 5/2021 | Kim | .............. | H04L 1/0047 |
| 11,811,580 B2* | 11/2023 | Yi | .............. | H04L 27/3405 |
| 2020/0266888 A1* | 8/2020 | Koganei | .............. | H04J 14/06 |
| 2021/0194596 A1* | 6/2021 | Kim | .............. | H04B 10/6932 |
| 2022/0131613 A1* | 4/2022 | Beacall | .............. | H04L 27/362 |

FOREIGN PATENT DOCUMENTS

| | | |
|---|---|---|
| JP | 2020-188357 A | 11/2020 |
| JP | 2021-141575 A | 9/2021 |

OTHER PUBLICATIONS

T. Fehenberger, G. Böcherer, A. Alvarado, and N. Hanik, "LDPC coded modulation with probabilistic shaping for optical fiber systems", in Proc. Opt. Fiber Commun. Conf., Los Angeles, CA, USA, Mar. 2015, Paper Th.2.A.23.

* cited by examiner

*Primary Examiner* — Pranesh K Barua
(74) *Attorney, Agent, or Firm* — Sughrue Mion, PLLC

(57) ABSTRACT

An object of the present disclosure is to provide a data processing device, a data processing method and a non-transitory computer readable medium capable of suppressing impairments of signal transmission. A data processing device includes at least one memory configured to store instructions and at least one processor configured to execute the instructions to: obtain input information bits; and generate a first output information bits and a second output information bits based on the input information bits, wherein the first output information bits correspond to constellation points of a constellation diagram on a first axis and the second output information bits correspond to constellation points of the constellation diagram on a second axis, and a probability of the constellation points on at least one of the first or the second axis follows a distribution, the distribution having a plurality of local maxima.

12 Claims, 10 Drawing Sheets

DATA PROCESSING DEVICE, DATA PROCESSING METHOD AND COMPUTER READABLE MEDIUM FOR TRANSMITTING A CARRIER SIGNAL

INCORPORATION BY REFERENCE

This application is based upon and claims the benefit of priority from Japanese patent application No. 2022-090556, filed on Jun. 3, 2022, the disclosure of which is incorporated herein in its entirety by reference.

TECHNICAL FIELD

The present disclosure relates to a data processing device, a transmitting apparatus, a communication system, a data processing method and a program.

BACKGROUND ART

A communication system such as a fiber-optic communication system has been developed recently.

During transmission of optical signals, a channel for the transmission usually suffers from noises from many factors. Noise sources tend to be Gaussian in nature, so such a noisy channel is often considered as an additive white Gaussian noise (AWGN) channel for convenience in analysis.

T. Fehenberger, G. Bocherer, A. Alvarado, and N. Hanik, "LDPC coded modulation with probabilistic shaping for optical fiber systems", in Proc. Opt. Fiber Commun. Conf., Los Angeles, CA, USA, March 2015, Paper Th.2.A.23. (NPL 1) discloses that optimal capacity for optical signals transmitted in an AWGN channel can be achieved with Maxwell-Boltzmann probability distribution shaped symbols.

As another related techniques, Japanese Unexamined Patent Application Publication No. 2021-141575 (PTL 1) discloses an optical transmitter for probabilistic shaping and symbol rate optimization. Specifically, in PTL 1, the optical transmitter includes one or more matcher elements, each configured to assign respective probabilities to symbols represented in received binary data dependent on a target probability distribution and to output a respective shaped bit sequence.

Further, Japanese Unexamined Patent Application Publication No. 2020-188357 (PTL 2) discloses an encoding device. Circuitry included in the encoding device assigns a symbol corresponding to a value of each of a plurality of bit strings in a frame among a plurality of the symbols in a constellation of a multi-level modulation scheme, to the plurality of bit strings.

In a signal transmission system, the transmission capacity is decreased by not only Gaussian noise but also nonlinearity impairments occurred from a variety of components, such as a driver, a modulator, a digital-to-analog converter (DAC), an analog-to-digital converter (ADC), an amplifier and a fiber. The nonlinearity impairments may lead to distortions in a received signal, for example, resulting in a higher error rate.

When the probabilistic constellation shaping (PCS) method is implemented, the problem of nonlinearity impairments may become even more severe. Because, signals processed by the PCS method (Hereafter, it is also described as PCS signals.) have a higher probability to be assigned to low-energy constellation points, while signals processed by quadrature amplitude modulation (QAM) method (Hereafter, it is also described as QAM signals.) have a uniform probability to be assigned to all constellation points. As a result, the PCS signals tend to have a noticeable higher peak-to-average power ratio than the QAM signals, leading to higher nonlinearity impairments. The techniques described in PTLs 1 and 2 and NPL 1 do not disclose the solution to the problem.

SUMMARY

An object of the present disclosure is to provide a data processing device, a transmitting apparatus, a communication system, a data processing method and a program capable of suppressing impairments of signal transmission.

According to one aspect of the disclosure, there is provided a data processing device that includes: at least one memory configured to store instructions and at least one processor configured to execute the instructions to: obtain input information bits; and generate a first output information bits and a second output information bits based on the input information bits, wherein the first output information bits correspond to constellation points of a constellation diagram on a first axis and the second output information bits correspond to constellation points of the constellation diagram on a second axis, and a probability of the constellation points on at least one of the first or the second axis follows a distribution, the distribution having a plurality of local maxima.

According to one aspect of the disclosure, there is provided a transmitting apparatus that includes: a data processing device including at least one memory configured to store instructions and at least one processor configured to execute the instructions to: obtain input information bits and generate a first output information bits and a second output information bits based on the input information bits; a first digital-to-analog converter (DAC) configured to convert the first output information bits generated by the data processing device into a first analog signal; a second DAC configured to convert the second output information bits generated by the data processing device into a second analog signal; and an in-phase quadrature (IQ) modulator configured to modulate the first and the second analog signals onto a first optical carrier signal generated by a laser source to form a modulated optical carrier signal, wherein the first output information bits correspond to constellation points of a constellation diagram on a first axis and the second output information bits correspond to constellation points of the constellation diagram on a second axis, and a probability of the constellation points on at least one of the first or the second axis follows a distribution, the distribution having a plurality of local maxima.

According to one aspect of the disclosure, there is provided a communication system that includes: a transmitting apparatus; and a receiving apparatus, wherein the transmitting apparatus includes: a data processing device including at least one memory configured to store instructions and at least one processor configured to execute the instructions to: obtain input information bits and generate a first output information bits and a second output information bits based on the input information bits; a first digital-to-analog converter (DAC) configured to convert the first output information bits generated by the data processing device into a first analog signal; a second DAC configured to convert the second output information bits generated by the data processing device into a second analog signal; and an in-phase quadrature (IQ) modulator configured to modulate the first and the second analog signals onto a first optical carrier signal generated by a first laser source to form a modulated optical carrier signal, wherein the first output information bits correspond to constellation points of a constellation diagram on a first axis and the second output information bits correspond to constellation points of the constellation diagram on a second axis, and a probability of the constellation points on at least one of the first or the second axis follows a distribution, the distribution having a plurality of local maxima, the receiving apparatus includes: a mixer configured to mix a second optical carrier signal generated by a second laser source with the modulated optical carrier signal to obtain an optical demodulated signal; a first photodetector configured to detect an amplitude of the optical demodulated signal to obtain a first analog demodulated signal; a second photodetector configured to detect an amplitude of the optical demodulated signal to obtain a second analog demodulated signal; a first analog-to-digital converter (ADC) configured to convert the first analog demodulated signal into a first digital demodulated signal; a second ADC configured to convert the second analog demodulated signal into a second digital demodulated signal; and an inverse transformation processing device configured to transform the first and the second digital demodulated signals into the first and second output information bits.

According to one aspect of the disclosure, there is provided a data processing method that includes: obtaining input information bits; and generating a first output information bits and a second output information bits based on the input information bits, wherein the first output information bits correspond to constellation points of a constellation diagram on a first axis and the second output information bits correspond to constellation points of the constellation diagram on a second axis, and a probability of the constellation points on at least one of the first or the second axis follows a distribution, the distribution having a plurality of local maxima.

According to one aspect of the disclosure, there is a program for causing a computer to execute: obtaining input information bits; and generating a first output information bits and a second output information bits based on the input information bits, wherein the first output information bits correspond to constellation points of a constellation diagram on a first axis and the second output information bits correspond to constellation points of the constellation diagram on a second axis, and a probability of the constellation points on at least one of the first or the second axis follows a distribution, the distribution having a plurality of local maxima.

According to the present disclosure, it is possible to provide a data processing device, a transmitting apparatus, a communication system, a data processing method and a program capable of suppressing impairments of signal transmission.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Figure 1:
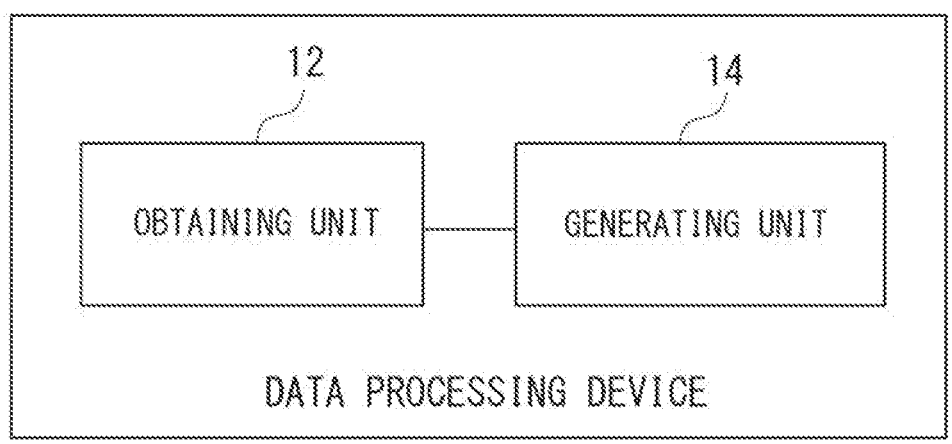
FIG. 1 is an example of a block diagram of a data processing device according to the first example embodiment.

Example embodiments according to the present disclosure will be described hereinafter with reference to the drawings. Note that the following description and the drawings are omitted and simplified as appropriate for clarifying the explanation. Further, the same elements are denoted by the same reference numerals (or symbols) throughout the drawings, and redundant descriptions thereof are omitted as required. Also, in this disclosure, unless otherwise specified, "at least one of A or B (A/B)" may mean any one of A or B, or both A and B. Similarly, when "at least one" is used for three or more elements, it can mean any one of these elements, or any plurality of elements (including all elements). Further, it should be noted that in the description of this disclosure, elements described using the singular forms such as "a", "an", "the" and "one" may be multiple elements unless explicitly stated.

First Example Embodiment (1A)

First, a data processing device 10 according to the first example embodiment of the present disclosure is explained with reference to FIG. 1.

Referring to FIG. 1, the data processing device 10 includes an obtaining unit 12 and a generating unit 14. At least one of components in the data processing device 10 includes, for example, one or more circuits. The data processing device 10 may be a part of one or more computers and/or machines for example, as a chip. The computers and/or machines may include a combination of one or a plurality of memories and one or a plurality of processors. Further, the data processing device 10 may be a part of a signal transmission system.

The obtaining unit 12 obtains input information bits and sent them to the generating unit 14. The input information bits may information to be transmitted to another device/computer from the data processing device 10, for example, by using an optical carrier signal. The obtaining unit 12 may receive the input information bits from another device. However, the data processing device 10 may generate the input information bits instead of receiving them.

The generating unit 14 generates a first output information bits and a second output information bits based on the input information bits. Specifically, the generating unit 14 sets the first and second output information bits as follows: the first output information bits correspond to constellation points of a constellation diagram on a first axis and the second output information bits correspond to constellation points of the constellation diagram on a second axis. The first and second axes may be described as I (In-Phase) and Q (Quadrature) axes of an IQ plane. The first output information bits and second output information bits may be sent to another device/computer.

Furthermore, the generating unit 14 sets a probability of the constellation points on at least one of the first or the second axis so that it follows a distribution, the distribution having a plurality of local maxima. Namely, the distribution function has two or more discrete local maxima, and a local minimum exists between these local maxima. The distribution function may be a symmetric function, but not limited to this.

Figure 2:
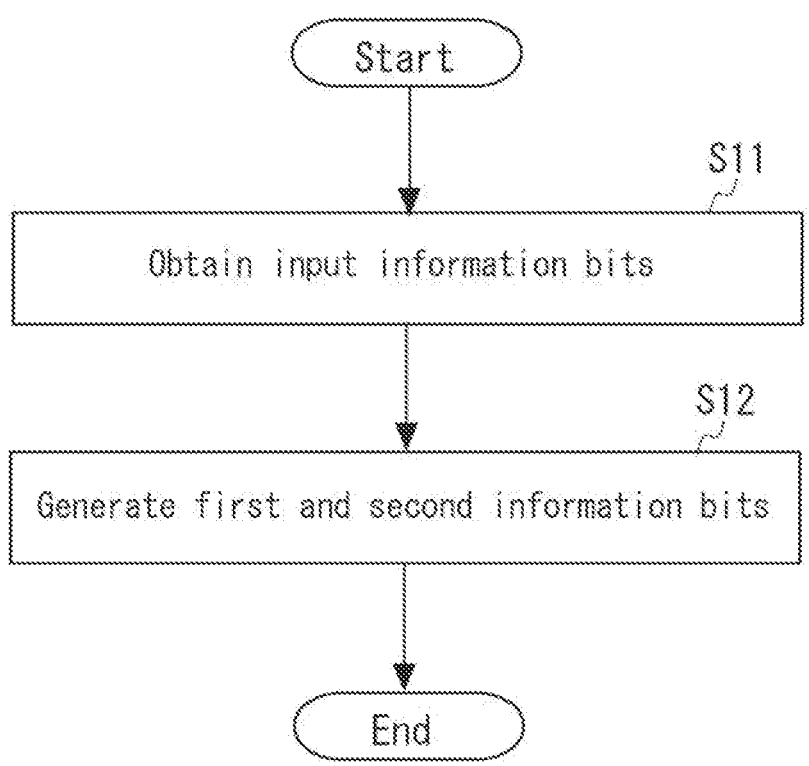
FIG. 2 is an example of a flowchart illustrating a method of the data processing device according to the first example embodiment.

Next, referring to the flowchart in FIG. 2, an example of the operation of the present example embodiment will be described. The detail of each processing in FIG. 2 is already explained above.

First, the obtaining unit 12 obtains input information bits (step S11). Next, the generating unit 14 generates a first output information bits and a second output information bits based on the input information bits (step S12).

As PCS signals have a higher probability to be assigned to low-energy constellation points, the nonlinearity problem may become worse. However, in the first example embodiment, the data processing device uses the distribution with a plurality of local maxima. Therefore, as the probability to be assigned to low-energy constellation points can be reduced compared to by using the PCS method, the data processing device 10 can suppress impairment of signal transmission of the first and second output information bits.

(1B)

As a variation of the data processing device 10, it may be configured as follows: the obtaining unit 12 generates the first pair of the first output information bits and the second output information bits and the second pair of the third output information bits and the fourth output information bits based on the input information bits. Specifically, the first output information bits correspond to constellation points of a constellation diagram on the first axis in the first polarization direction and the second output information bits correspond to constellation points of the constellation diagram on the second axis in the first polarization direction. Furthermore, the third output information bits correspond to constellation points of a constellation diagram on the first axis in the second polarization direction and the fourth output information bits correspond to constellation points of the constellation diagram on the second axis in the second polarization direction.

In this example, a probability of the constellation points on at least one of the first or the second axis in the first polarization direction follows a first distribution, the first distribution having a plurality of local maxima, and a probability of the constellation points on at least one of the first or the second axis in the second polarization direction follows a second distribution, the second distribution having a plurality of local maxima.

The data processing device 10 in (1B) can suppress impairment of signal transmission of the output information bits as shown in (1A).

(1C)

The data processing device 10 shown in (1A) may also be incorporated into a transmitter. The transmitter includes the data processing device 10, the first digital-to-analog converter (DAC), the second DAC, and an in-phase quadrature (IQ) modulator. As explained previously, the data processing device 10 is configured to obtain input information bits and generate the first output information bits and the second output information bits based on the input information bits. The first output information bits correspond to constellation points of a constellation diagram on a first axis and the second output information bits correspond to constellation points of the constellation diagram on the second axis, and a probability of the constellation points on at least one of the first or the second axis follows a distribution, the distribution having a plurality of local maxima.

Further, the first DAC converts the first output information bits generated by the data processing device into the first analog signal, and the second DAC converts the second output information bits generated by the data processing device into the second analog signal. The IQ modulator modulates the first and the second analog signals onto an optical carrier signal generated by a laser source to form a modulated optical carrier signal. One or more optional components of the above transmitter may be configured as hardware circuits or devices.

The data processing device 10 shown in (1B) may be incorporated into the transmitter instead of the data processing device 10 shown in (1A). The transmitter shown in (1C) can suppress impairment of signal transmission of the first and second output information bits.

(1D)

In addition, the transmitter shown in (1C) may also be incorporated into a communication system as a transmitting apparatus. The communication system includes the transmitting apparatus and a receiving apparatus.

Specifically, the transmitting apparatus includes the data processing device 10, the first DAC, the second DAC, and the IQ modulator. The description of the data processing device 10, the first DAC and the second DAC is omitted, as described in (1C). The data processing device 10 may be the data processing device shown in (1A) or the data processing device shown in (1B). Further, the IQ modulator modulates the first and the second analog signals onto the first optical carrier signal generated by a first laser source to form a modulated optical carrier signal.

The receiving apparatus includes a mixer, the first photodetector, the second photodetector, the first analog-to-digital converter (ADC), the second ADC and an inverse transformation processing device. In detail, the mixer mixes the second optical carrier signal generated by the second laser source with the modulated optical carrier signal to obtain an optical demodulated signal. The first photodetector detects an amplitude of the optical demodulated signal to obtain the first analog demodulated signal, and the second photodetector detects an amplitude of the optical demodulated signal to obtain the second analog demodulated signal. The first ADC converts the first analog demodulated signal into the first digital demodulated signal, and the second ADC converts the second analog demodulated signal into the second digital demodulated signal. The inverse transformation processing device transforms the first and the second digital demodulated signals into the first and second output information bits. One or more optional components of the above receiving apparatus may be configured as hardware circuits or devices. Further, the transmitting apparatus can be regarded as a kind of data processing device.

The communication system shown in (1D) can suppress impairment of signal transmission in communication.

Second Example Embodiment

The second example embodiment of this disclosure will be described below referring to the accompanied drawings. This second example embodiment explains one of the specific examples of application of the first embodiment.

Figure 3:
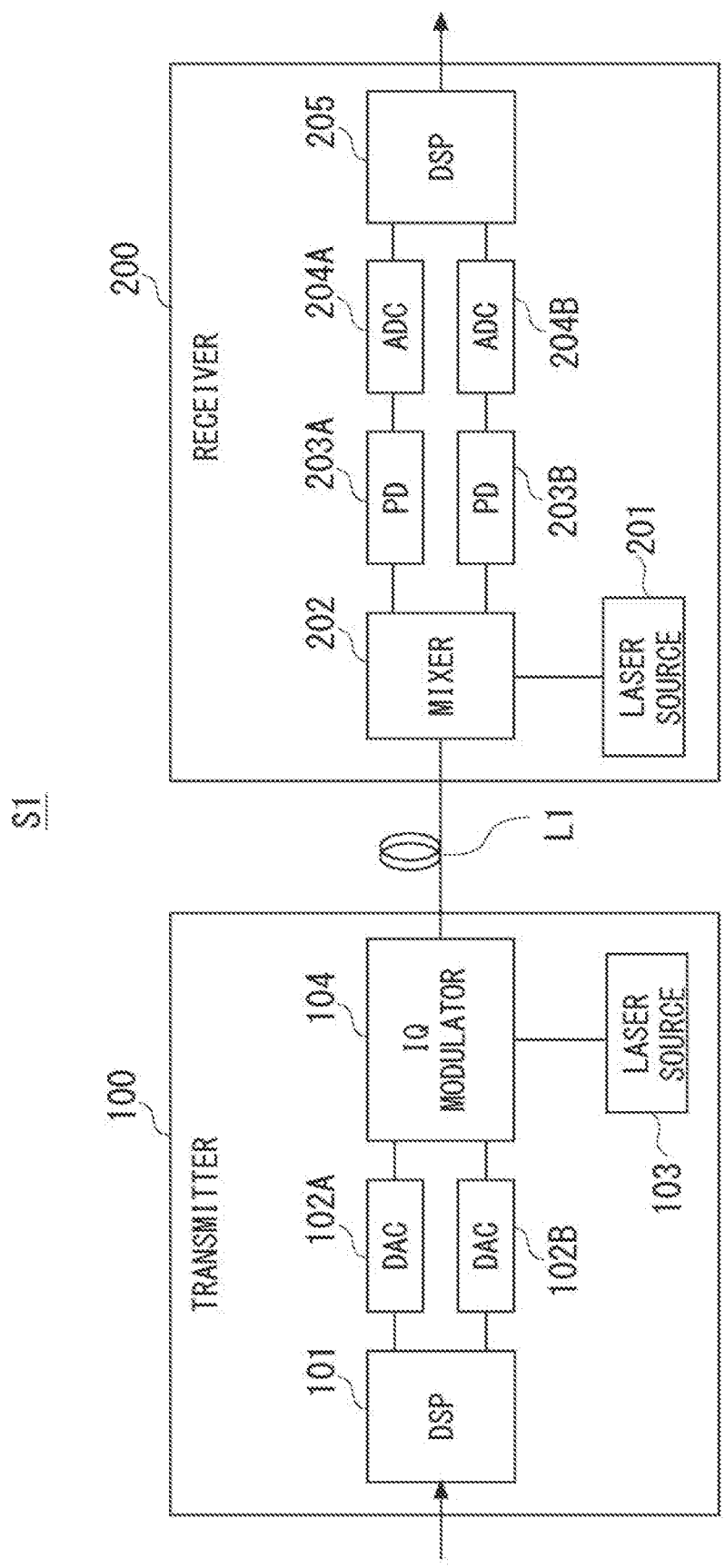
FIG. 3 is an example of a block diagram of a fiber-optic communication system according to the second example embodiment.

FIG. 3 illustrates an example of a block diagram of a fiber-optic communication system. The fiber-optic communication system S1 in FIG. 3 enables coherent optical communications which uses phase modulation as well as amplitude modulation of an optical carrier signal to carry information. The fiber-optic communication system S1 includes a transmitter 100, a receiver 200 and an optical link L1. The transmitter 100 and the receiver 200 is connected by the optical link L1 and the transmitter 100 sends the receiver 200 information as an optical signal via the optical link L1.

As shown in FIG. 3, the transmitter 100 in the fiber-optic communication system S1 comprises a digital signal processor (DSP) 101, digital-to-analog converters (DACs) 102, a laser source 103 and an in-phase quadrature (IQ) modulator 104. For simplicity, some components in the transmitter 100 are not illustrated and discussed. The omitted components may include, but are not limited to, at least one of an amplifier, a driver, or a bias circuit. Each unit of the transmitter 100 will be explained in detail. The transmitter 100 functions as an encoder.

The DSP 101 is a hardware device which executes operations configured by software stored in a memory (not shown). The DSP 101 may be called as a transmitter DSP and performs digital signal processing for information bits (input sequence of bits) received by the DSP 101. The DSP 101 is an example of the data processing device 10 in (1A). The information bits to be transmitted as a modulated optical carrier signal (Details will be described later.) do not require a predetermined configuration. In other words, the information bits may be completely arbitrary. In this example, the information bits are binary information.

Figure 4:
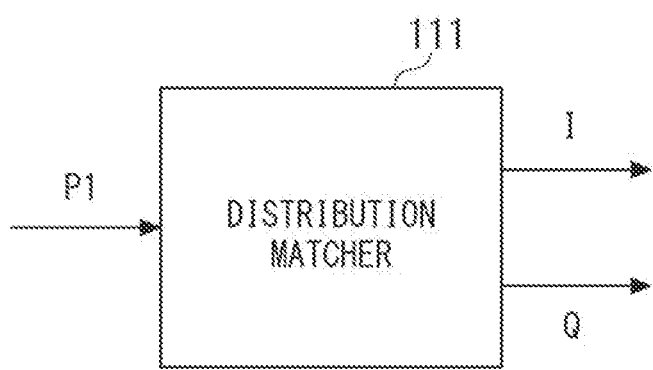
FIG. 4 is an example of a block diagram of a DSP in a transmitter according to the second example embodiment.

FIG. 4 is an example of a block diagram of the DSP 101. As shown in FIG. 4, the DSP 101 includes a distribution matcher 111. The information bits P1 are input to the distribution matcher 111 and the distribution matcher 111 shapes the information bits P1 to independently shape each signal dimension based on an M-ary pulse amplitude modulation (M-PAM) template. The distribution matcher 111 generates a pair of an in-phase (I) digital signal (the first sequence of bits) and a quadrature (Q) digital signal (the second sequence of bits) from the information bits P1. The distribution matcher 111 outputs shaped bits of the I and Q digital signals on two lanes to the DACs 102 connected to the DSP 101. The distribution matcher 111 and the IQ modulator 104 are connected by the I and Q lanes. The I digital signals are transmitted via the I lane and the Q digital signals are transmitted via the Q lane. The I digital signals correspond to a sequence of the constellation points of an IQ plane on I axis, and the Q digital signals correspond to a sequence of the constellation points of the IQ plane on Q axis.

Given the M-PAM symbol set X=±1, ±3, ..., ±(M−1), the probability of constellation point x∈X is generated according to the following distribution:

$$P(x) = \frac{e^{-\lambda(|x|-\mu)^2}}{\sum e^{-\lambda(|x'|-\mu)^2}}, \lambda > 0, \mu > 0, \quad (1)$$

wherein x is an amplitude corresponding to each of the constellation points along one of the I and Q axes, |x| is the absolute value of x, x' denotes all x to be summed, λ is a shaping factor, p is a peak factor and e is the Euler's number. The distribution function (1) has two local maxima, and the denominator in (1) is used to normalise the distribution. The information bits P1 is shaped by using this distribution. In this example, the I and Q digital signals are signals shaped by the distribution. However, any of the I or Q digital signal may be a signal shaped by the distribution.

Figure 5:
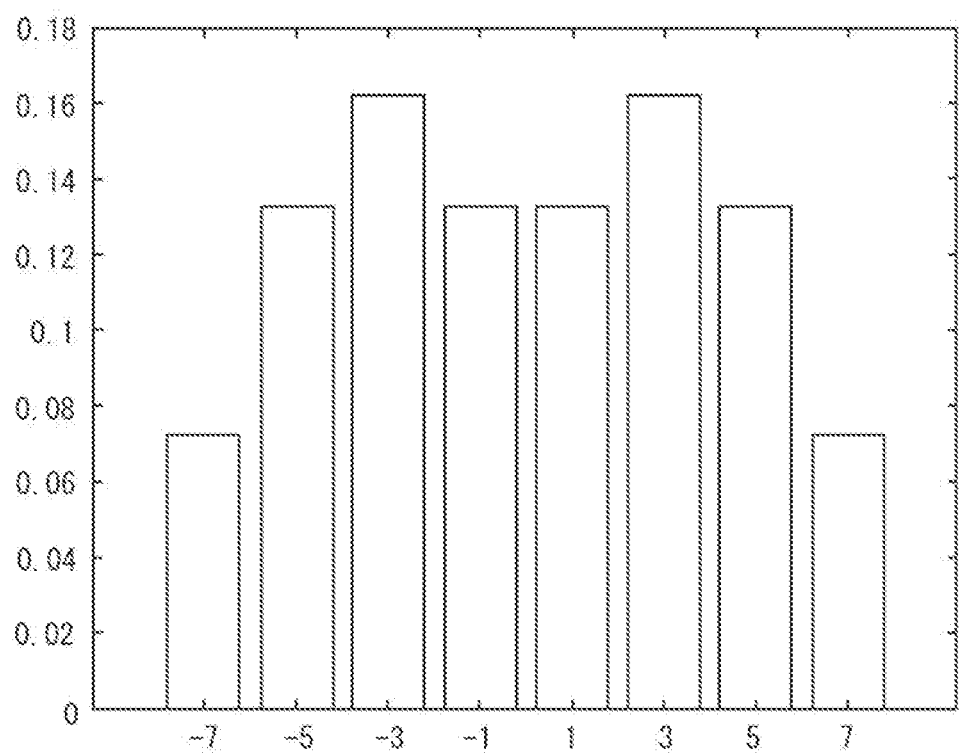
FIG. 5 illustrates an example probabilistic distribution of output shaped bits.

FIG. 5 illustrates an example probabilistic distribution of the output shaped bits for the I lane. In this example, PCS for a 64-QAM signal is demonstrated. The shaping factor λ is set as 0.05 and the peak factor μ is set as 3 in this example. The x-axis of FIG. 5 is the amplitude of the output shaped bits for the I lane and the y-axis of FIG. 5 is the probability of the output shaped bits for the I lane according to different amplitudes. As shown in FIG. 5, there are two local maxima of the probability (about 0.16) at x=+3 and −3. The example probabilistic distribution of the output shaped bits for the Q lane is the same as that shown in FIG. 5.

Both the shaping factor λ and the peak factor μ determine the entropy rate H(X) of the shaped QAM signal in bits/symbol. In specific, the binary entropy is denoted by the following equation:

$$H(X) = -2 \cdot \Sigma P(x) \log_2 P(x) \quad (2)$$

As the shaping factor λ and the peak factor μ change, the distribution contains a fractional number of 1<H(X)/2<m bits/symbol. Hence, the rate adaptation can be realized by tuning at least one of the value of the shaping factor λ or the value of the peak factor μ.

Referring back to the FIG. 3, the output shaped bits of the distribution matcher 111 for I and Q are transmitted to the DACs 102A and 102B, respectively. The DAC 102A transforms the output shaped bits for the I lane from digital format to analog format and the DAC 102B transforms the output shaped bits for the Q lane from digital format to analog format. The analog drive signals generated by the DACs 102A and 102B eventually enter the IQ modulator 104. As explained below, the IQ modulator 104 generates a transmission signal which is probabilistically shaped and modulated based on the analog information for I and Q.

The laser source 103 produces the first optical carrier signal and output it to the IQ modulator 104. The IQ modulator 104 receives the I and Q analog drive signals from the DACs 102A and 102B and modulates them using the first optical carrier signal for transmission in the optical link L1.

Figure 6:
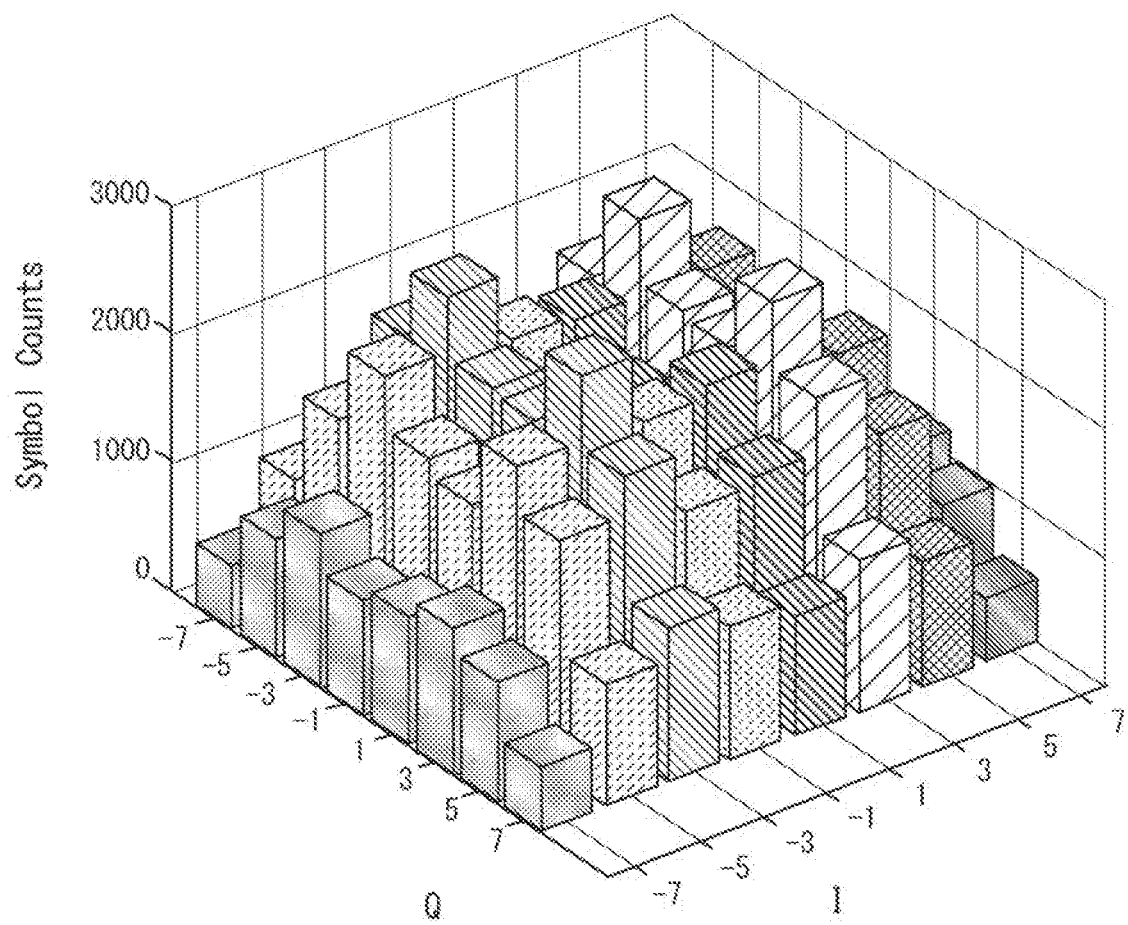
FIG. 6 illustrates a constellation of an example shaped modulated optical carrier signal.

FIG. 6 illustrates the constellation of an example shaped modulated optical carrier signal (i.e., the transmission signal) generated by the IQ modulator 104. In this example, 100000 randomly-picked bits are used as the information bits for the distribution matcher 111, and the shaping factor λ and the peak factor μ in the distribution matcher 111 are 0.05 and 3, respectively. The x and y axes of FIG. 5 are the amplitudes of the output shaped bits for the I and Q lane, respectively. Further, the number of every constellation point in the example shaped 64-QAM modulated signal is plotted and indicated in the z-axis in FIG. 6.

It is noted that, in FIG. 6, the constellation points with the highest probabilities are not the constellation points with the lowest signal powers, so that the average power of the shaped modulated optical signal is increased. To be more specific, the average power of the shaped modulated optical carrier signal is determined by the both the shaping factor λ and the peak factor μ. Since the peak power of the shaped modulated optical carrier signal is fixed, the peak-to-average power ratio (PAPR) may be reduced. With a lower PAPR, an advantageous effect having lower nonlinearity impairments of the communication system could be achieved.

In addition, it is noted that the distribution function is not limited to the distribution function with only one maximum probability point. A distribution function of the general form with one or a plurality of maximum probability points encompassing the case (1) is expressed as follows:

$$P(x) = \frac{\sum e^{-\lambda_i(|x|-\mu_i)^2}}{\sum\sum e^{-\lambda'_i(|x'_j|-\mu'_i)^2}}, \lambda_i > 0, \mu_i > 0, \quad (3)$$

wherein x is an amplitude corresponding to each of the constellation points along one of the I and Q axes, |x| is the absolute value of x, $x_j'$ denotes all x to be summed, $\lambda_i$ is a shaping factor, μi is a peak factor, e is the Euler's number and i and j are independently summed indices (The number of i is half the number of local maxima.). The number of i is greater than or equal to one and if the number of i is one, the distribution function (3) is equal to the distribution function (1). The denominator in (3) is used to normalise the distribution. Both the I and Q digital signals may be signals shaped by the distribution, however, any of the I or Q digital signal may be a signal shaped by the distribution.

Referring back to the FIG. 3, the optical link L1 comprises one or more spans of optical fibers. The optical link L1 may have at least one of an optical amplifier, a repeater or another device for monitoring and configuring the optical link L1. The optical link L1 sends the transmission signal to the receiver 200.

The receiver 200 is configured to execute operations to receive the transmission signal generated by the IQ modulator 104 via the optical link L1 and recover the input information bits from the received transmission signal. The receiver 200 in the fiber-optic communication system S1 comprises a laser source 201, a mixer 202, photodetectors (PDs) 203, ADCs 204 and a DSP 205. For simplicity, some components in the receiver 200 are not illustrated and discussed. The omitted components may include, but are not limited to, at least one of an amplifier, a driver, or a bias circuit. Each unit of the receiver 200 will be explained in detail.

The laser source 201 produces the second optical carrier signal (local optical carrier signal) and output it to the mixer 202. The mixer 202 mixes the second optical carrier signal generated by the laser source 201 with the received transmission signal to obtain the optical demodulated signal.

The PD 203A detects the amplitude of the optical demodulated signal to obtain an analog demodulated signal for I and the PD 203B detects the amplitude of the optical demodulated signal to obtain an analog demodulated signal for Q. In this way, the analog demodulated signals in pairs of I and Q are generated and each of the analog demodulated signals are output to the ADC 204A and 204B, respectively.

The ADC 204A is configured to sample the analog demodulated signal from the PD 203A to generate a digital demodulated signal for I and the ADC 204B is configured to sample the analog demodulated signal from the PD 203B to generate a corresponding digital demodulated signal for Q. In this way, the digital demodulated signals in pairs of I and Q are generated and sent to the DSP 205.

The DSP 205 is a hardware device which executes operations configured by software stored in a memory (not shown). The DSP 205 may be called as a receiver DSP and performs digital signal processing for the digital demodulated signals input to the DSP 205 in order to recover the input information bits.

Figure 7:
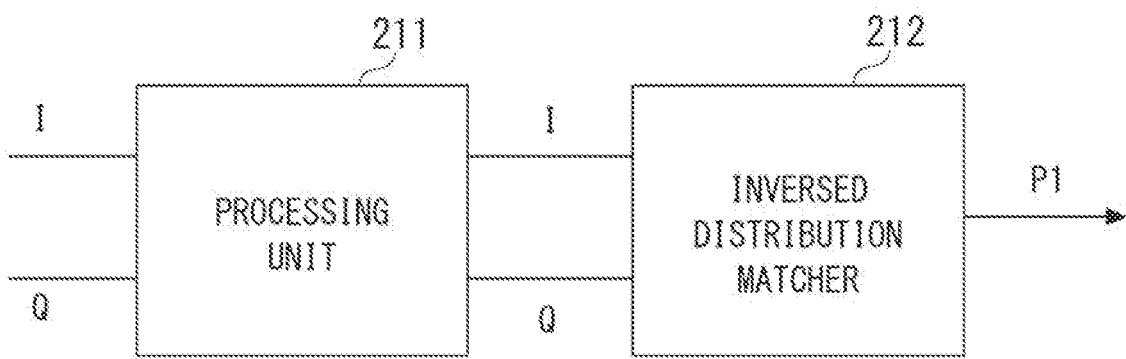
FIG. 7 is an example of a block diagram of a DSP in a receiver according to the second example embodiment.

FIG. 7 is an example of a block diagram of the DSP 205. As shown in FIG. 7, the DSP 205 includes a processing unit 211 and an inversed distribution matcher 212.

The processing unit 211 is configured to apply a plurality of processing actions to the received digital demodulated signals for I and Q, including but not limited to crosstalk equalization, carrier recovery, and matched filtering. The processed signals for I and Q are sent to the inversed distribution matcher 212.

The inversed distribution matcher 212 is configured to inversely turn the processed signals for I and Q to the input information bits based on an inverse M-PAM template. That is, the inversed distribution matcher 212 executes a conversion process reverse to the conversion process executed by the distribution matcher 111.

Digital coherent transmission is widely used in modern telecommunications to transmit information. Data are modulated by changing the amplitude and phase of carriers in accordance with a variety of modulation formats, such as quadrature phase shift keying (QPSK), 8-QAM, 16-QAM, 32-QAM, and 64-QAM, where the spectral efficiencies (SE) are 3, 4, 5, and 6 bit/s/Hz, respectively.

Those modulation formats have uniform distribution of constellation points. That is to say, information bits are modulated into corresponding constellation points having an equal probability. The occurrence of probability of any constellation point is the same as others.

For the digital fiber-optic communication system with the aforementioned modulation format, although the required signal to noise ratio (SNR) for error-free communication with forward error correction (FEC) can be tuned by applying different modulation formats, there are not much candidate modulation formats. This situation results in a large granularity.

Recently, techniques have been developed to improve the granularity of those uniformly distributed modulation formats. One of the most popular techniques is PCS. The PCS technique shapes the probability distribution of symbols from a uniform distribution to a Gaussian distribution.

As mentioned above, during transmission of optical signals, a channel for the transmission usually suffers from noises (especially AWGN) from many factors. As a related technique, NPL 1 discloses the method using the Maxwell-Boltzmann probability distribution, one example of the Gaussian distribution. For a given transmission distance with a required SNR with FEC threshold, there is an optimal SE which maximize the channel capacity. Unlike a coarse granularity of SEs of uniformly distributed signals, the Gaussian distribution shaped signals show dense granularity, since the SE can be finely tuned by the shaping factor.

However, in a signal transmission system, the transmission capacity is decreased by not only Gaussian noise but also nonlinearity impairments occurred from a variety of components. When the PCS method is implemented, the problem of nonlinearity impairments may become even more severe, as noted above.

The fiber-optic communication system S1 can limit the occurrence of this problem by using the normalized distribution with a plurality of local maxima. Compared to the PCS encoder using Maxwell-Boltzmann distribution, the average power of shaped signals increases while the peak power of the shaped signals remains the same.

Specifically, the transmitter 100 (encoder device) comprises the distribution matcher 111 configured to output the sequence of symbols. Each symbol in the sequence corresponds to each of the constellation points in an in-phase quadrature (IQ) plane having in-phase and quadrature axes. The distribution of the constellation points is configured by a normalized distribution with a plurality of local maxima. Therefore, the PAPR in the second example embodiment decreases compared to the related techniques and it results in better nonlinearity tolerance. In addition, with the disclosed processes, it is possible for the fiber-optic communication system S1 to achieve a required spectral efficiency with the benefit of higher tolerance for nonlinear effects.

Further, the symmetric distribution function may be P(x) as defined above, thus the transmitter 100 can set the symmetric distribution function in an easy format. Especially, if the distribution function has a plurality of maximum probability points, the aforementioned effect becomes stronger.

As a variation of the above description, the distribution function is not limited to the one defined in (1) or (3). Specifically, it may be asymmetric. For example, a function of the general form encompassing the case (1) is expressed as follows:

$$P(x) = \begin{cases} \dfrac{e^{-\lambda_1(|x|-\mu_1)^2}}{\sum_{-\infty}^{0} e^{-\lambda_1(|x'|-\mu_1)^2} + \sum_{0}^{+\infty} e^{-\lambda_2(|x'|-\mu_2)^2}}, & x \le 0, \\ \dfrac{e^{-\lambda_2(|x|-\mu_2)^2}}{\sum_{-\infty}^{0} e^{-\lambda_1(|x'|-\mu_1)^2} + \sum_{0}^{+\infty} e^{-\lambda_2(|x'|-\mu_2)^2}}, & x > 0 \end{cases} \quad (4)$$

wherein x is an amplitude corresponding to each of the constellation points along one of the I and Q axes, |x| is the absolute value of x, x' denotes all x to be summed, $\lambda_1$ and $\lambda_2$ are shaping factors, $\mu_1$ and $\mu_2$ are peak factors ($\lambda_1>0$, $\lambda_2>0$, $\mu_1>0$ and $\mu_2>0$) and e is the Euler's number. In (4), the values of $\lambda_1$ and $\lambda_2$ may be different or the same, and the values of $\mu_1$ and $\mu_2$ may be different or the same. If the values of $\lambda_1$ and $\lambda_2$ are the same and the values of $\mu_1$ and $\mu_2$ are the same, the distribution function (4) is equal to the distribution function (1). The denominator in (4) is used to normalise the distribution.

In addition, a function of the general form encompassing the case (3) is expressed as follows:

$$P(x) = \begin{cases} \dfrac{\sum e^{-\lambda_{1i}(|x|-\mu_{1i})^2}}{\sum\sum_{-\infty}^{0} e^{-\lambda'_{1i}(|x'_j|-\mu'_{1j})^2} + \sum\sum_{0}^{+\infty} e^{-\lambda'_{2i}(|x'_j|-\mu'_{2i})^2}}, & x \le 0, \\ \dfrac{\sum e^{-\lambda_{2i}(|x|-\mu_{2i})^2}}{\sum\sum_{-\infty}^{0} e^{-\lambda'_{1i}(|x'_j|-\mu'_{1i})^2} + \sum\sum_{0}^{+\infty} e^{-\lambda'_{2i}(|x'_j|-\mu'_{2i})^2}}, & x > 0 \end{cases} \quad (5)$$

wherein x is an amplitude corresponding to each of the constellation points along one of the I and Q axes, |x| is the absolute value of x, x' denotes all x to be summed, $\lambda_{1i}$ and $\lambda_{2i}$ are shaping factors, $\mu_{1i}$ and $\mu_{2i}$ are peak factors ($\lambda_{1i}>0$, $\lambda_{2i}>0$, $\mu_{1i}>0$ and $\mu_{2i}>0$) and e is the Euler's number. In (5), the values of $\lambda_{1i}$ and $\lambda_{2i}$ may be different or the same, and the values of $\mu_{1i}$ and $\mu_{2i}$ may be different or the same. If the values of $\lambda_{1i}$ and $\lambda_{2i}$ are the same and the values of $\mu_{1i}$ and $\mu_{2i}$ are the same, the distribution function (5) is equal to the distribution function (3). The denominator in (5) is used to normalise the distribution.

Third Example Embodiment

The third example embodiment of this disclosure will be described below referring to the accompanied drawings. This third example embodiment explains another specific example of application of the first embodiment. However, specific examples of the first example embodiment are not limited to the second and third example embodiments. The same explanations as in the second example embodiment may be omitted.

Figure 8:
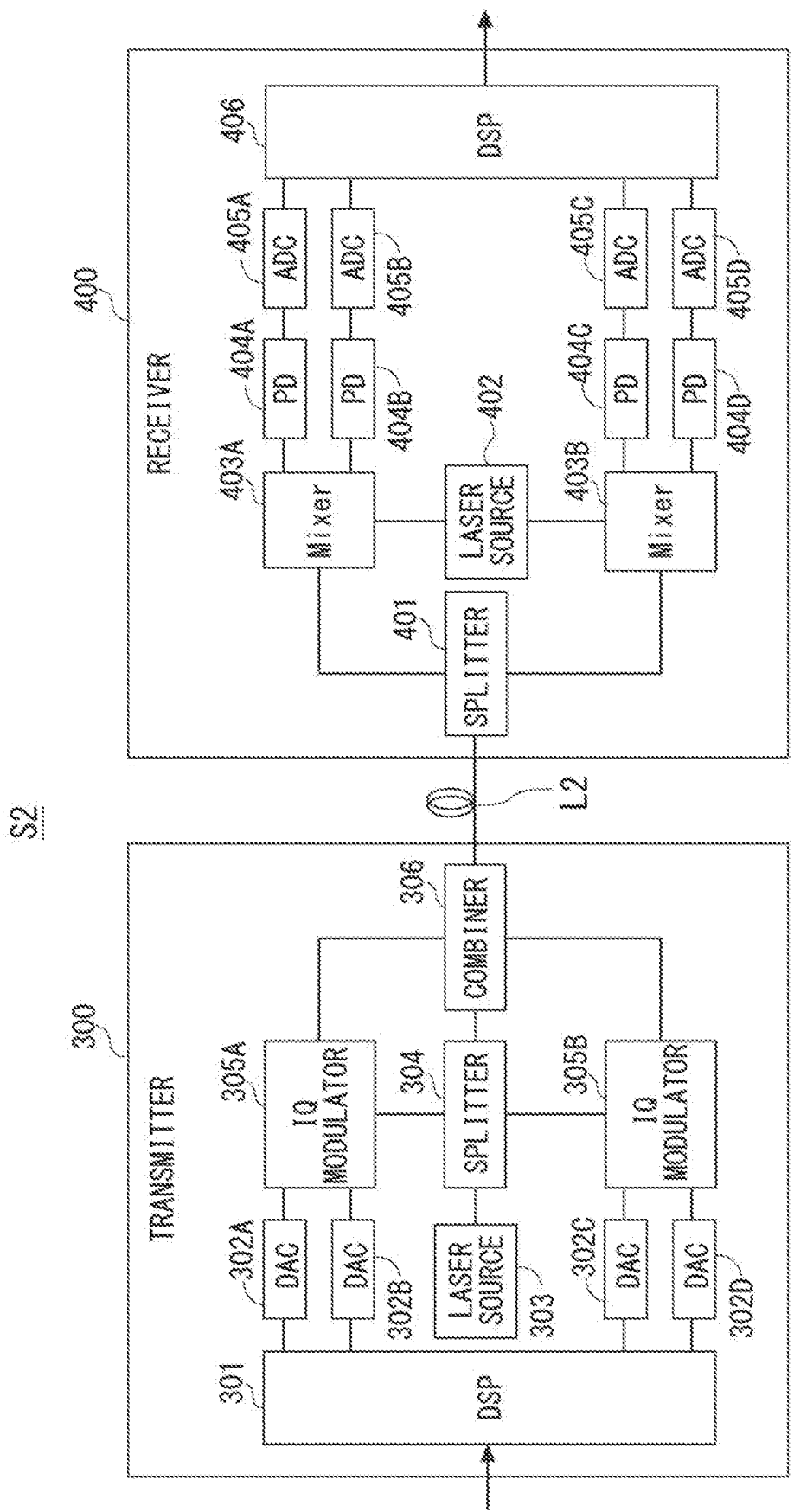
FIG. 8 is another example of a block diagram of a fiber-optic communication system according to the third example embodiment.

FIG. 8 illustrates another example of a block diagram of a fiber-optic communication system. As in the fiber-optic communication system S1 of the second example embodiment, the fiber-optic communication system S2 in FIG. 8 enables coherent optical communications which uses phase modulation as well as amplitude modulation of an optical carrier signal to carry information. Further, polarization-division multiplexing (PDM) is configured in this system S2. The fiber-optic communication system S2 includes a transmitter 300, a receiver 400 and an optical link L2. The transmitter 300 and the receiver 400 is connected by the optical link L2 and the transmitter 300 sends the receiver 400 information as an optical signal via the optical link L2.

The DSP 301 is a hardware device which executes operations configured by software stored in a memory (not shown). The DSP 301 may be called as a transmitter DSP and performs digital signal processing for information bits (input sequence of bits) received by the DSP 301. The DSP 301 is another example of the data processing device 10 in (1B). The information bits to be transmitted as a modulated optical carrier signal do not require a predetermined configuration.

Figure 9:
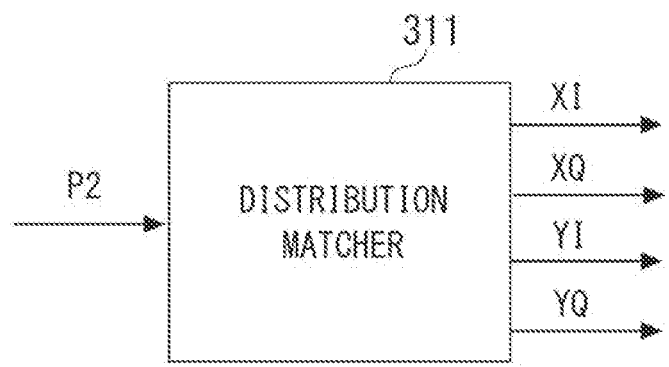
FIG. 9 is an example of a block diagram of a DSP in a transmitter according to the third example embodiment.

FIG. 9 is an example of a block diagram of the DSP 301. As shown in FIG. 9, the DSP 301 includes a distribution matcher 311. The information bits P2 are input to the distribution matcher 311 and the distribution matcher 311 divides the information bits P2 into the first set of information bits for the first polarization direction (X) and the second set of information bits for the second polarization direction (Y). Further, the distribution matcher 311 shapes each set of information bits to independently shape each signal dimension based on an M-PAM template. The distribution matcher 311 generates a pair of an in-phase (I) digital signal and a quadrature (Q) digital signal for each set of information bits (X and Y). As a result, the distribution matcher 311 outputs shaped bits on two lanes of XI and XQ regarding the first set of information bits (the first pair of the first output information bits and the second output information bits) and shaped bits on two lanes of YI and YQ regarding the second set of information bits (the second pair of the third output information bits and the fourth output information bits) to the DACs 302 connected to the DSP 301. The XI and XQ digital signals are horizontally polarized signals and the YI and YQ digital signals are vertically polarized signals. The distribution matcher 311 and the IQ modulator 305A are connected by the XI and XQ lanes. Also, the distribution matcher 311 and the IQ modulator 305B are connected by the YI and YQ lanes. The XI, XQ, YI and YQ digital signals are transmitted via the XI, XQ, YI and YQ lanes, respectively. The XI and XQ digital signals correspond to a sequence of the constellation points of the first set of information bits of an IQ plane on I and Q axes, respectively, and the YI and YQ digital signals correspond to a sequence of the constellation points of the second set of information bits of an IQ plane on I and Q axes, respectively. For the first set of information bits, given the M-PAM symbol set X=±1, ±3, . . . , ±(M−1), the probability of constellation point x∈X in the first polarization direction is generated according to the following distribution:

$$P(x) = \frac{e^{-\lambda_1(|x|-\mu_1)^2}}{\sum e^{-\lambda_1(|x'|-\mu_1)^2}}, \lambda_1 > 0, \mu_1 > 0, \quad (6)$$

wherein x is an amplitude corresponding to each of the constellation points along one of the I and Q axes in the first polarization direction, |x| is the absolute value of x, x' denotes all x to be summed, $\lambda_1$ is a shaping factor, $\mu_1$ is a peak factor and e is the Euler's number. The distribution function (6) has two local maxima, and the denominator in (6) is used to normalise the distribution. The first set of information bits are shaped by using this distribution. In this example, the XI and XQ digital signals are signals shaped by the distribution. However, any of the XI or XQ digital signal may be a signal shaped by the distribution.

Both the shaping factor $\lambda_1$ and the peak factor $\mu_1$ determine the entropy rate H(X) of the shaped QAM signal in bits/symbol for the first polarization direction. In specific, the binary entropy is denoted by the following equation:

$$H(X) = -2 \cdot \Sigma P(x) \log_2 P(x) \quad (7)$$

As the shaping factor $\lambda_1$ and the peak factor $\mu_1$ change, the distribution contains a fractional number of 1<H(X)/2<m bits/symbol. Hence, the rate adaptation can be realized by tuning at least one of the value of the shaping factor $\lambda_1$ or the value of the peak factor $\mu_1$.

For the second set of information bits, given the M-PAM symbol set Y=±1, ±3, . . . , ±(M−1), the probability of constellation point y∈Y in the second polarization direction is generated according to the following distribution:

$$P(y) = \frac{e^{-\lambda_2(|y|-\mu_2)^2}}{\sum e^{-\lambda_2(|y'|-\mu_2)^2}}, \lambda_2 > 0, \mu_2 > 0, \quad (8)$$

wherein y is an amplitude corresponding to each of the constellation points along one of the I and Q axes in the second polarization direction, |y| is the absolute value of y, y' denotes all y to be summed, $\lambda_2$ is a shaping factor, $\mu_2$ is a peak factor and e is the Euler's number. The distribution function (8) has two local maxima, and the denominator in (8) is used to normalise the distribution. The second set of information bits are shaped by using this distribution. In this example, the YI and YQ digital signals are signals shaped by the distribution. However, any of the YI or YQ digital signal may be a signal shaped by the distribution.

Both the shaping factor $\lambda_2$ and the peak factor $\mu_2$ determine the entropy rate H(Y) of the shaped QAM signal in bits/symbol for the second polarization direction. In specific, the binary entropy is denoted by the following equation:

$$H(Y) = -2 \cdot \Sigma P(y) \log_2 P(y) \quad (9)$$

As the shaping factor $\lambda_2$ and the peak factor $\mu_2$ change, the distribution contains a fractional number of 1<H(Y)/2<m bits/symbol. Hence, the rate adaptation can be realized by tuning at least one of the value of the shaping factor $\lambda_2$ or the value of the peak factor $\mu_2$.

Referring back to the FIG. 8, the output shaped bits of the distribution matcher 311 for I and Q are transmitted to the DACs 302A to 302D. The DAC 302A and 302B transform the output shaped bits for the XI and XQ lanes from digital format to analog format, respectively. Also, the DAC 302C and 302D transform the output shaped bits for the YI and YQ lanes from digital format to analog format, respectively. The analog drive signals generated by the process of the DACs 302A and 302B eventually enter the IQ modulator 305A and the analog drive signals generated by the process of the DACs 302C and 302D eventually enter the IQ modulator 305B. As explained below, the IQ modulator 305A generates a transmission signal which is probabilistically shaped and modulated based on the analog information for I and Q for the first set of information bits. Further, the IQ modulator 305B generates a transmission signal which is probabilistically shaped and modulated based on the analog information for I and Q for the second set of information bits.

The laser source 303 produces the first optical carrier signal and output it to the splitter 304. The splitter 304 is a polarization beam splitter configured to split the first optical carrier signal into two orthogonally polarized components. Each of the two orthogonally polarized components has the first polarization direction and the second polarization direction, respectively.

The IQ modulator 305A receives a pair of the XI and XQ analog drive signals and modulates them using the first polarized component generated by the splitter 304 for transmission in the optical link L2. Also, the IQ modulator 305B receives a pair of the YI and YQ analog drive signals and modulates them using the second polarized component generated by the splitter 304 for transmission in the optical link L2. The modulated optical signals generated by the IQ modulators 305A and 305B are orthogonally polarized signals. The combiner 306 is configured to combine the two modulated optical signals to generate a single modulated optical carrier signal for transmission in the optical link L2 by using the PDM method.

It is noted that the distribution function is not limited to the distribution function with only one maximum probability point. A distribution function of the general form with one or a plurality of maximum probability points encompassing the case (6) is expressed as follows:

$$P(x) = \frac{\sum e^{-\lambda_{1i}(|x|-\mu_{1i})^2}}{\sum\sum e^{-\lambda_{1i}(|x'_j|-\mu_{1i})^2}}, \lambda_{1i} > 0, \mu_{1i} > 0, \quad (10)$$

wherein x is an amplitude corresponding to each of the constellation points along one of the I and Q axes in the first polarization direction, |x| is the absolute value of x, $x'_j$ denotes all x to be summed, $\lambda_{1i}$ is a shaping factor, $\mu_{1i}$ is a peak factor, e is the Euler's number and i and j are independently summed indices (The number of i is half the number of local maxima.). The number of i is greater than or equal to one and if the number of i is one, the distribution function (10) is equal to the distribution function (6). The denominator in (10) is used to normalise the distribution.

Further, a distribution function of the general form with one or a plurality of maximum probability points encompassing the case (8) is expressed as follows:

$$P(y) = \frac{\sum e^{-\lambda_{2i}(|y|-\mu_{2i})^2}}{\sum\sum e^{-\lambda'_{2i}(|y'_j|-\mu'_{2i})^2}}, \lambda_{2i} > 0, \mu_{2i} > 0, \quad (11)$$

wherein y is an amplitude corresponding to each of the constellation points along one of the I and Q axes in the second polarization direction, |y| is the absolute value of y, $y_j'$ denotes all y to be summed, $\lambda_{2i}$ is a shaping factor, $\mu_{2i}$ is a peak factor, e is the Euler's number and i and j are independently summed indices (The number of i is half the number of local maxima.). The number of i is greater than or equal to one and if the number of i is one, the distribution function (11) is equal to the distribution function (8). The denominator in (11) is used to normalise the distribution. In the first polarization direction, both the I and Q digital signals may be signals shaped by the distribution, however, any of the I or Q digital signal may be a signal shaped by the distribution. The same can be said about the second polarization direction.

Referring back to the FIG. 8, the optical link L2 may have the same configuration and function as the optical link Li in the second example embodiment, thus the detailed explanation of the optical link L2 is omitted.

The receiver 400 is configured to execute operations to receive the modulated optical carrier signal generated by the transmitter 300 via the optical link L2 and recover the input information bits from the modulated optical carrier signal. The receiver 400 in the fiber-optic communication system S2 comprises a splitter 401, a laser source 402, mixers 403, PDs 404, ADCs 405 and DSPs 406. For simplicity, some components in the receiver 400 are not illustrated and discussed. The omitted components may include, but are not limited to, at least one of an amplifier, a driver, or a bias circuit. Each unit of the receiver 400 will be explained in detail.

The splitter 401 is a polarization beam splitter configured to split the received modulated optical carrier signal into two orthogonally polarized components. The first polarized components with the first polarization direction are sent to the mixer 403A and the second polarized components with the second polarization direction are sent to the mixer 403B. The laser source 402 produces the second optical carrier signal (local optical carrier signal) corresponding to the first optical carrier signal and output it to the mixers 403.

The mixer 403A mixes the second optical carrier signal generated by the laser source 402 with the first polarized components to obtain the optical demodulated signal. Also, the mixer 403B mixes the second optical carrier signal generated by the laser source 402 with the second polarized components to obtain the optical demodulated signal.

The PD 404A detects the amplitude of the optical demodulated signal generated by the mixer 403A to obtain an analog demodulated signal for XI and the PD 404B detects the amplitude of the optical demodulated signal generated by the mixer 403A to obtain an analog demodulated signal for XQ. Similarly, the PD 404C detects the amplitude of the optical demodulated signal generated by the mixer 403B to obtain an analog demodulated signal for YI and the PD 404D detects the amplitude of the optical demodulated signal generated by the mixer 403B to obtain an analog demodulated signal for YQ. In this way, the analog demodulated signals in pairs of I and Q for the first set of information bits (X) are generated and each of the analog demodulated signals are output to the ADC 405A and 405B, respectively. Further, the analog demodulated signals in pairs of I and Q for the second set of information bits (Y) are generated and each of the analog demodulated signals are output to the ADC 405C and 405D, respectively.

The ADC 405A is configured to sample the analog demodulated signal from the PD 404A to generate a digital demodulated signal for XI and the ADC 405B is configured to sample the analog demodulated signal from the PD 404B to generate a digital demodulated signal for XQ. Also, the ADC 405C is configured to sample the analog demodulated signal from the PD 404C to generate a digital demodulated signal for YI and the ADC 405D is configured to sample the analog demodulated signal from the PD 404D to generate a digital demodulated signal for YQ. In this way, the digital demodulated signals in pairs of I and Q for the first and second set of information bits (X and Y) are generated and sent to the DSP 406.

The DSP 406 is a hardware device which executes operations configured by software stored in a memory (not shown). The DSP 406 may be called as a receiver DSP and performs digital signal processing for the digital demodulated signals input to the DSP 406 in order to recover the input information bits.

Figure 10:
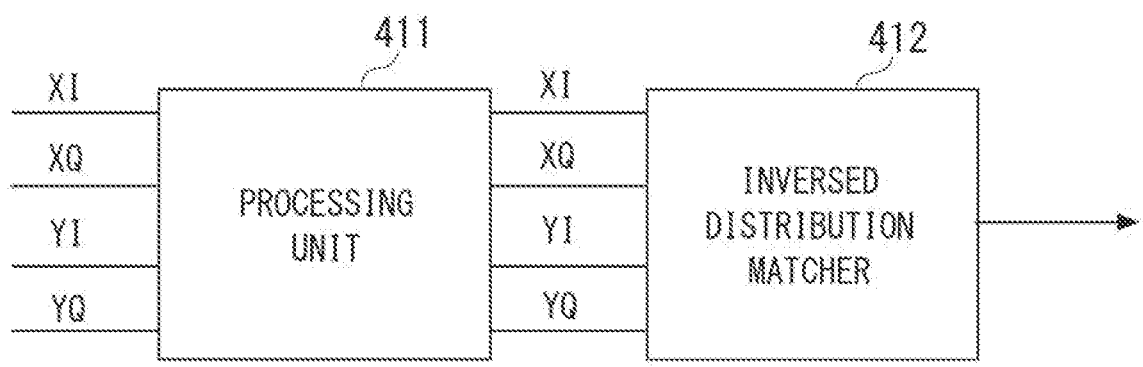
FIG. 10 is an example of a block diagram of a DSP in a receiver according to the third example embodiment.

FIG. 10 is an example of a block diagram of the DSP 406. As shown in FIG. 10, the DSP 406 includes a processing unit 411 and an inversed distribution matcher 412.

The processing unit 411 is configured to apply a plurality of processing actions to the received digital demodulated signals for XI, XQ, YI and YQ, including but not limited to crosstalk equalization, carrier recovery, and matched filtering. The processed signals for XI to YQ are sent to the inversed distribution matcher 412.

The inversed distribution matcher 412 is configured to inversely turn the processed signals for XI to YQ to the input information bits based on an inverse M-PAM template. That is, the inversed distribution matcher 412 executes a conversion process reverse to the conversion process executed by the distribution matcher 311.

For the same reason as in the second example embodiment, the fiber-optic communication system S2 can limit the occurrence of this problem by using the normalized distribution with a plurality of local maxima. Further, such an effect exists when the fiber-optic communication system implements the PDM method.

As a variation of the above description, the distribution function is not limited to the one defined in (6), (8), (10) or (11). Specifically, it may be asymmetric. For example, a function of the general form encompassing the case (6) is expressed as follows:

$$P(x) = \begin{cases} \dfrac{e^{-\lambda_{\alpha 1}(|x|-\mu_{\alpha 1})^2}}{\sum_{-\infty}^{0} e^{-\lambda_{\alpha 1}(|x'|-\mu_{\alpha 1})^2} + \sum_{0}^{+\infty} e^{-\lambda_{\alpha 2}(|x'|-\mu_{\alpha 2})^2}}, & x \leq 0, \\ \dfrac{e^{-\lambda_{\alpha 2}(|x|-\mu_{\alpha 2})^2}}{\sum_{-\infty}^{0} e^{-\lambda_{\alpha 1}(|x'|-\mu_{\alpha 1})^2} + \sum_{0}^{+\infty} e^{-\lambda_{\alpha 2}(|x'|-\mu_{\alpha 2})^2}}, & x > 0 \end{cases} \quad (12)$$

wherein x is an amplitude corresponding to each of the constellation points along one of the I and Q axes in the first polarization direction, |x| is the absolute value of x, x' denotes all x to be summed, $\lambda_{\alpha 1}$ and $\lambda_{\alpha 2}$ are shaping factors, $\mu_{\alpha 1}$ and $\mu_{\alpha 2}$ are peak factors ($\lambda_{\alpha 1} > 0$, $\lambda_{\alpha 2} > 0$, $\mu_{\alpha 1} > 0$ and $\mu_{\alpha 2} > 0$) and e is the Euler's number. In (12), the values of $\lambda_{\alpha 1}$ and $\lambda_{\alpha2}$ may be different or the same, and the values of $\mu_{\alpha1}$ and $\mu_{\alpha2}$ may be different or the same. If the values of $\lambda_{\alpha1}$ and $\lambda_{\alpha2}$ are the same and the values of $\mu_{\alpha1}$ and $\mu_{\alpha2}$ are the same, the distribution function (12) is equal to the distribution function (6). The denominator in (12) is used to normalise the distribution.

In addition, a function of the general form encompassing the case (8) is expressed as follows:

$$P(y) = \begin{cases} \dfrac{e^{-\lambda_{\beta1}(|y|-\mu_{\beta1})^2}}{\sum_{-\infty}^{0} e^{-\lambda_{\beta1}(|y'|-\mu_{\beta1})^2} + \sum_{0}^{+\infty} e^{-\lambda_{\beta2}(|y'|-\mu_{\beta2})^2}}, & y \leq 0, \\ \dfrac{e^{-\lambda_{\beta2}(|y|-\mu_{\beta2})^2}}{\sum_{-\infty}^{0} e^{-\lambda_{\beta1}(|y'|-\mu_{\beta1})^2} + \sum_{0}^{+\infty} e^{-\lambda_{\beta2}(|y'|-\mu_{\beta2})^2}}, & y > 0 \end{cases} \quad (13)$$

wherein y is an amplitude corresponding to each of the constellation points along one of the I and Q axes in the second polarization direction, |y| is the absolute value of y, y' denotes all y to be summed, $\lambda_{\beta1}$ and $\lambda_{\beta2}$ are shaping factors, $\mu_{\beta1}$ and $\mu_{\beta2}$ are peak factors ($\lambda_{\beta1}>0$, $\lambda_{\beta2}>0$, $\mu_{\beta1}>0$ and $\mu_{\beta2}>0$) and e is the Euler's number. In (13), the values of $\lambda_{\beta1}$ and $\lambda_{\beta2}$ may be different or the same, and the values of $\mu_{\beta1}$ and $\mu_{\beta2}$ may be different or the same. If the values of $\lambda_{\beta1}$ and $\lambda_{\beta2}$ are the same and the values of $\mu_{\beta1}$ and $\mu_{\beta2}$ are the same, the distribution function (13) is equal to the distribution function (8). The denominator in (13) is used to normalise the distribution.

Further, a function of the general form encompassing the case (10) is expressed as follows:

$$P(x) = \begin{cases} \dfrac{\sum e^{-\lambda_{\alpha1i}(|x|-\mu_{\alpha1i})^2}}{\sum\sum_{-\infty}^{0} e^{-\lambda'_{\alpha1i}(|x'_j|-\mu'_{\alpha1j})^2} + \sum\sum_{0}^{+\infty} e^{-\lambda'_{\alpha2i}(|x'_j|-\mu'_{\alpha2i})^2}}, & x \leq 0, \\ \dfrac{\sum e^{-\lambda_{\alpha2i}(|x|-\mu_{\alpha2i})^2}}{\sum\sum_{-\infty}^{0} e^{-\lambda'_{\alpha1i}(|x'_j|-\mu'_{\alpha1i})^2} + \sum\sum_{0}^{+\infty} e^{-\lambda'_{\alpha2i}(|x'_j|-\mu'_{\alpha2i})^2}}, & x > 0 \end{cases} \quad (12)$$

wherein x is an amplitude corresponding to each of the constellation points along one of the I and Q axes in the first polarization direction, |x| is the absolute value of x, x' denotes all x to be summed, $\lambda_{\alpha1i}$ and $\lambda_{\alpha2i}$ are shaping factors, $\mu_{\alpha1i}$ and $\mu_{\alpha2i}$ are peak factors ($\lambda_{\alpha1i}>0$, $\lambda_{\alpha2i}>0$, $\mu_{\alpha1i}>0$ and $\mu_{\alpha2i}>0$) and e is the Euler's number. In (14), the values of $\lambda_{\alpha1i}$ and $\lambda_{\alpha2i}$ may be different or the same, and the values of $\mu_{\alpha1i}$ and $\mu_{\alpha2i}$ may be different or the same. If the values of $\lambda_{\alpha1i}$ and $\lambda_{\alpha2i}$ are the same and the values of $\mu_{\alpha1i}$ and $\mu_{\alpha2i}$ are the same, the distribution function (14) is equal to the distribution function (10). The denominator in (14) is used to normalise the distribution.

Also, a function of the general form encompassing the case (11) is expressed as follows:

$$P(y) = \begin{cases} \dfrac{\sum e^{-\lambda_{\beta1i}(|y|-\mu_{\beta1i})^2}}{\sum\sum_{-\infty}^{0} e^{-\lambda'_{\beta1i}(|y'_j|-\mu'_{\beta1i})^2} + \sum\sum_{0}^{+\infty} e^{-\lambda'_{\beta2i}(|y'_j|-\mu'_{\beta2i})^2}}, & y \leq 0, \\ \dfrac{\sum e^{-\lambda_{\beta2i}(|y|-\mu_{\beta2i})^2}}{\sum\sum_{-\infty}^{0} e^{-\lambda'_{\beta1i}(|y'_j|-\mu'_{\beta1i})^2} + \sum\sum_{0}^{+\infty} e^{-\lambda'_{\beta2i}(|y'_j|-\mu'_{\beta2i})^2}}, & y > 0, \end{cases} \quad (15)$$

wherein y is an amplitude corresponding to each of the constellation points along one of the I and Q axes in the second polarization direction, |y| is the absolute value of y, y' denotes all y to be summed, $\lambda_{\beta1i}$ and $\lambda_{\beta2i}$ are shaping factors, $\mu_{\beta1i}$ and $\mu_{\beta2i}$ are peak factors ($\lambda_{\beta1i}>0$, $\lambda_{\beta2i}>0$, $\mu_{\beta1i}>0$ and $\mu_{\beta2i}>0$) and e is the Euler's number. In (15), the values of $\lambda_{\beta1i}$ and $\lambda_{\beta2i}$ may be different or the same, and the values of $\mu_{\beta1i}$ and $\mu_{\beta2i}$ may be different or the same. If the values of $\lambda_{\beta1i}$ and $\lambda_{\beta2i}$ are the same and the values of $\mu_{\beta1i}$ and $\mu_{\beta2i}$ are the same, the distribution function (15) is equal to the distribution function (11). The denominator in (15) is used to normalise the distribution.

Modification and adjustment of each example embodiment and each example are possible within the scope of the overall disclosure (including the claims) of the present disclosure and based on the basic technical concept of the present disclosure. The present embodiments are, therefore, to be considered in all respects to be illustrative and not restrictive.

For example, in the second example embodiment, the probabilistic distribution of the output shaped bits has a plurality of local maxima of the probability for both I and Q lanes. However, either an I or Q lane may have the probabilistic distribution of the output shaped bits with a plurality of local maxima. The same can be said for the third example embodiment.

Further, in the second example embodiment, the probabilistic distribution is the Gaussian distribution with a plurality of local maxima. However, the probabilistic distribution may be an arbitrary function with a plurality of local maxima, such as an arbitrary transcendental function other than the Gaussian function, an arbitrary algebraic function (e.g., a polynomial or a rational function), and so on. The same can be said for the third example embodiment.

Next, a configuration example of the data processing device or fiber-optic communication system explained in the above-described plurality of embodiments is explained hereinafter with reference to FIG. 11.

Figure 11:
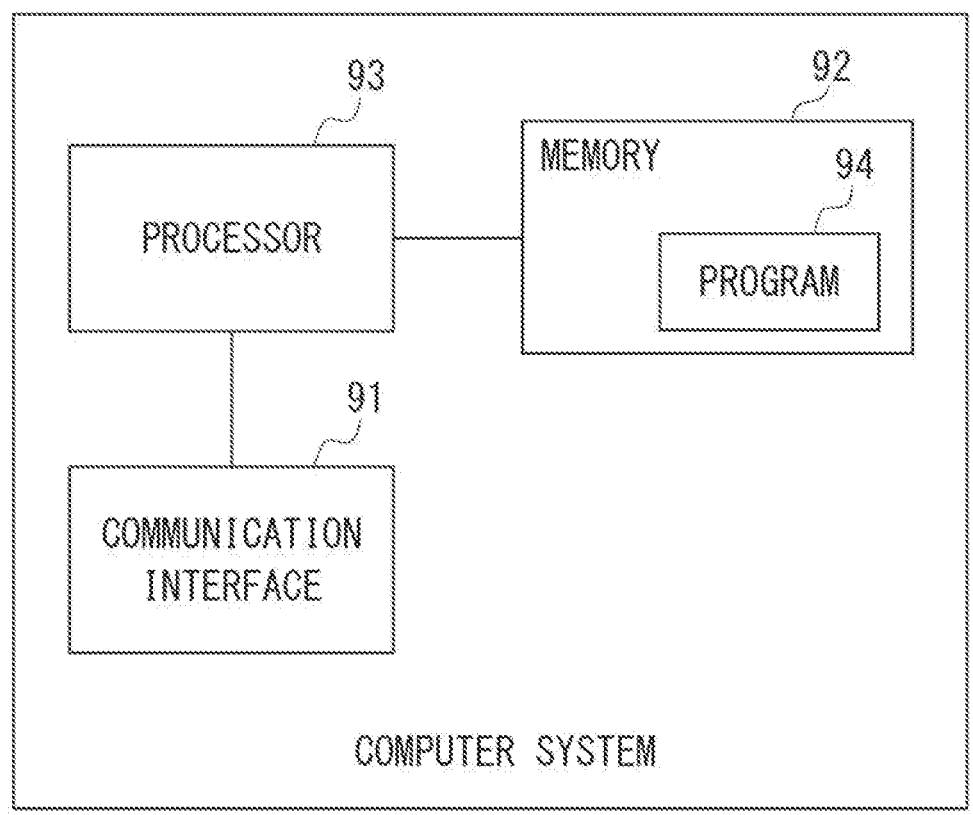
FIG. 11 is a block diagram showing a hardware configuration example of a data processing device or a communication system according to example embodiments.

The data processing device 10, the transmitter and receiver of the fiber-optic communication system S1 or S2, may be implemented on a computer system as illustrated in FIG. 11. Referring to FIG. 11, a computer system 90, such as an information processing apparatus or the like, includes a communication interface 91, a memory 92 and a processor 93.

The communication interface 91 (e.g., a network interface controller (NIC)) may be configured to communicate with other computer(s) and/or machine(s) to receive and/or send data. For example, the obtaining unit 12 may include the communication interface 91.

The memory 92 stores program 94 (program instructions) to enable the computer system 90 to carry out the data processing described in the embodiments. The memory 92 includes, for example, a semiconductor memory (for example, Random Access Memory (RAM), Read Only Memory (ROM), Electrically Erasable and Programmable ROM (EEPROM), and/or a storage device including at least one of Hard Disk Drive (HDD), SSD (Solid State Drive), Compact Disc (CD), Digital Versatile Disc (DVD) and so forth. From another point of view, the memory 92 is formed by a volatile memory and/or a nonvolatile memory. The memory 92 may include a storage disposed apart from the processor 93. In this case, the processor 93 may access the memory 92 through an I/O interface (not shown).

The processor 93 is configured to read the program 94 (program instructions) from the memory 92 to execute the program 94 (program instructions) to realize the functions and processes of the above-described plurality of embodiments. The processor 93 may be, for example, a microprocessor, an MPU (Micro Processing Unit), or a CPU (Central Processing Unit). Furthermore, the processor 93 may include a plurality of processors. In this case, each of the processors executes one or a plurality of programs including a group of instructions to cause a computer to perform an algorithm explained above with reference to the drawings.

The program 94 includes program instructions (program modules) for executing processing of each unit of the data processing device 10 or the fiber-optic communication system S1 or S2 in the above-described plurality of embodiments.

The program includes instructions (or software codes) that, when loaded into a computer, cause the computer to perform one or more of the functions described in the embodiments. The program may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray disc (®: Registered trademark) or other optical disk storage, magnetic cassettes, magnetic tape, magnetic disk storage or other magnetic storage devices. The program may be transmitted on a transitory computer readable medium or a communication medium. By way of example, and not limitation, transitory computer readable media or communication media can include electrical, optical, acoustical, or other form of propagated signals.

Part of or all the foregoing embodiments can be described as in the following appendixes, but the present disclosure is not limited thereto.

Supplementary Note 1

A data processing device comprising:
an obtaining means for obtaining input information bits; and
a generating means for generating a first output information bits and a second output information bits based on the input information bits, wherein
the first output information bits correspond to constellation points of a constellation diagram on a first axis and the second output information bits correspond to constellation points of the constellation diagram on a second axis, and
a probability of the constellation points on at least one of the first or the second axis follows a distribution, the distribution having a plurality of local maxima.

Supplementary Note 2

The data processing device according to Supplementary Note 1, wherein
the distribution is described as P(x) as follows:

$$P(x) = \begin{cases} \dfrac{e^{-\lambda_1(|x|-\mu_1)^2}}{\sum_{-\infty}^{0} e^{-\lambda_1(|x'|-\mu_1)^2} + \sum_{0}^{+\infty} e^{-\lambda_2(|x'|-\mu_2)^2}}, & x \leq 0, \\ \dfrac{e^{-\lambda_2(|x|-\mu_2)^2}}{\sum_{-\infty}^{0} e^{-\lambda_1(|x'|-\mu_1)^2} + \sum_{0}^{+\infty} e^{-\lambda_2(|x'|-\mu_2)^2}}, & x > 0, \end{cases} \quad (16)$$

wherein x is an amplitude corresponding to each of the constellation points along one of the first and second axes, |x| is the absolute value of x, x' denotes all x to be summed, $\lambda_1 > 0$, $\lambda_2 > 0$, $\mu_1 > 0$, $\mu_2 > 0$ and e is the Euler's number.

Supplementary Note 3

The data processing device according to Supplementary Note 1, wherein
the distribution is described as P(x) as follows:

$$P(x) = \begin{cases} \dfrac{\sum e^{-\lambda_{1i}(|x|-\mu_{1i})^2}}{\sum\sum_{-\infty}^{0} e^{-\lambda'_{1i}(|x'_j|-\mu'_{1i})^2} + \sum\sum_{0}^{+\infty} e^{-\lambda'_{2i}(|x'_j|-\mu'_{2i})^2}}, & x \leq 0, \\ \dfrac{\sum e^{-\lambda_{2i}(|x|-\mu_{2i})^2}}{\sum\sum_{-\infty}^{0} e^{-\lambda'_{1i}(|x'_j|-\mu'_{1i})^2} + \sum\sum_{0}^{+\infty} e^{-\lambda'_{2i}(|x'_j|-\mu'_{2i})^2}}, & x > 0, \end{cases} \quad (17)$$

wherein x is an amplitude corresponding to each of the constellation points along one of the first and second axes, |x| is the absolute value of x, $x_j'$ denotes all x to be summed, $\lambda_{1i} > 0$, $\lambda_{2i} > 0$, $\mu_{1i} > 0$, $\mu_{2i} > 0$, e is the Euler's number and i and j are independently summed indices.

Supplementary Note 4

The data processing device according to Supplementary Note 1, wherein
the generating means generates a first pair of the first output information bits and the second output information bits and a second pair of a third output information bits and a fourth output information bits based on the input information bits,
the first output information bits correspond to constellation points of a constellation diagram on a first axis in a first polarization direction and the second output information bits correspond to constellation points of the constellation diagram on a second axis in the first polarization direction,
the third output information bits correspond to constellation points of a constellation diagram on a first axis in a second polarization direction and the fourth output information bits correspond to constellation points of the constellation diagram on a second axis in the second polarization direction,
a probability of the constellation points on at least one of the first or the second axis in the first polarization direction follows a first distribution, the first distribution having a plurality of local maxima, and
a probability of the constellation points on at least one of the first or the second axis in the second polarization direction follows a second distribution, the second distribution having a plurality of local maxima.

Supplementary Note 5

The data processing device according to Supplementary Note 4, wherein
the first distribution is described as P(x) as follows:

$$P(x) = \begin{cases} \dfrac{e^{-\lambda_{\alpha 1}(|x|-\mu_{\alpha 1})^2}}{\sum_{-\infty}^{0} e^{-\lambda_{\alpha 1}(|x'|-\mu_{\alpha 1})^2} + \sum_{0}^{+\infty} e^{-\lambda_{\alpha 2}(|x'|-\mu_{\alpha 2})^2}}, & x \leq 0, \\ \dfrac{e^{-\lambda_{\alpha 2}(|x|-\mu_{\alpha 2})^2}}{\sum_{-\infty}^{0} e^{-\lambda_{\alpha 1}(|x'|-\mu_{\alpha 1})^2} + \sum_{0}^{+\infty} e^{-\lambda_{\alpha 2}(|x'|-\mu_{\alpha 2})^2}}, & x > 0, \end{cases} \quad (18)$$

wherein x is an amplitude corresponding to each of the constellation points along one of the first and second axes in the first polarization direction, |x| is the absolute value of x, x' denotes all x to be summed, $\lambda_{\alpha 1}>0$, $\lambda_{\alpha 2}>0$, $\mu_{\alpha 1}>0$, $\mu_{\alpha 2}>0$ and e is the Euler's number; and
the second distribution is described as P(y) as follows:

$$P(y) = \begin{cases} \dfrac{e^{-\lambda_{\beta 1}(|y|-\mu_{\beta 1})^2}}{\sum_{-\infty}^{0} e^{-\lambda_{\beta 1}(|y'|-\mu_{\beta 1})^2} + \sum_{0}^{+\infty} e^{-\lambda_{\beta 2}(|y'|-\mu_{\beta 2})^2}}, & y \leq 0, \\ \dfrac{e^{-\lambda_{\beta 2}(|y|-\mu_{\beta 2})^2}}{\sum_{-\infty}^{0} e^{-\lambda_{\beta 1}(|y'|-\mu_{\beta 1})^2} + \sum_{0}^{+\infty} e^{-\lambda_{\beta 2}(|y'|-\mu_{\beta 2})^2}}, & y > 0, \end{cases} \quad (19)$$

wherein y is an amplitude corresponding to each of the constellation points along one of the first and second axes in the second polarization direction, |y| is the absolute value of y, y' denotes all y to be summed, $\lambda_{\beta 1}>0$, $\lambda_{\beta 2}>0$, $\mu_{\beta 1}>0$, $\mu_{\beta 2}>0$ and e is the Euler's number.

Supplementary Note 6

The data processing device according to Supplementary Note 4, wherein
the first distribution is described as P(x) as follows:

$$P(x) = \begin{cases} \dfrac{\sum e^{-\lambda_{\alpha 1i}(|x|-\mu_{\alpha 1i})^2}}{\sum\sum_{-\infty}^{0} e^{-\lambda'_{\alpha 1i}(|x'_j|-\mu'_{\alpha 1i})^2} + \sum\sum_{0}^{+\infty} e^{-\lambda'_{\alpha 2i}(|x'_j|-\mu'_{\alpha 2i})^2}}, & x \leq 0, \\ \dfrac{\sum e^{-\lambda_{\alpha 2i}(|x|-\mu_{\alpha 2i})^2}}{\sum\sum_{-\infty}^{0} e^{-\lambda'_{\alpha 1i}(|x'_j|-\mu'_{\alpha 1i})^2} + \sum\sum_{0}^{+\infty} e^{-\lambda'_{\alpha 2i}(|x'_j|-\mu'_{\alpha 2i})^2}}, & x > 0, \end{cases} \quad (20)$$

wherein x is an amplitude corresponding to each of the constellation points along one of the first and second axes in the first polarization direction, |x| is the absolute value of x, $x_j'$ denotes all x to be summed, $\lambda_{\alpha 1i}>0$, $\lambda_{\alpha 2i}>0$, $\mu_{\alpha 1i}>0$, $\mu_{\alpha 2i}>0$, e is the Euler's number and i and j are independently summed indices; and
the second distribution is described as P(y) as follows:

$$P(y) = \begin{cases} \dfrac{\sum e^{-\lambda_{\beta 1i}(|y|-\mu_{\beta 1i})^2}}{\sum\sum_{-\infty}^{0} e^{-\lambda'_{\beta 1i}(|y'_j|-\mu'_{\beta 1i})^2} + \sum\sum_{0}^{+\infty} e^{-\lambda'_{\beta 2i}(|y'_j|-\mu'_{\beta 2i})^2}}, & y \leq 0, \\ \dfrac{\sum e^{-\lambda_{\beta 2i}(|y|-\mu_{\beta 2i})^2}}{\sum\sum_{-\infty}^{0} e^{-\lambda'_{\beta 1i}(|y'_j|-\mu'_{\beta 1i})^2} + \sum\sum_{0}^{+\infty} e^{-\lambda'_{\beta 2i}(|y'_j|-\mu'_{\beta 2i})^2}}, & y > 0, \end{cases} \quad (21)$$

wherein y is an amplitude corresponding to each of the constellation points along one of the first and second axes in the second polarization direction, |y| is the absolute value of y, $y_j'$ denotes all y to be summed, $\lambda_{\beta 1i}>0$, $\lambda_{\beta 2i}>0$, $\mu_{\beta 1i}>0$, $\mu_{\beta 2i}>0$, e is the Euler's number and i and j are independently summed indices.

Supplementary Note 7

A transmitting apparatus comprising:
a data processing device configured to obtain input information bits and generate a first output information bits and a second output information bits based on the input information bits;
a first digital-to-analog converter (DAC) configured to convert the first output information bits generated by the data processing device into a first analog signal;
a second DAC configured to convert the second output information bits generated by the data processing device into a second analog signal; and
an in-phase quadrature (IQ) modulator configured to modulate the first and the second analog signals onto an optical carrier signal generated by a laser source to form a modulated optical carrier signal, wherein
the first output information bits correspond to constellation points of a constellation diagram on a first axis and the second output information bits correspond to constellation points of the constellation diagram on a second axis, and
a probability of the constellation points on at least one of the first or the second axis follows a distribution, the distribution having a plurality of local maxima.

Supplementary Note 8

The transmitting apparatus according to Supplementary Note 7, wherein
the distribution is described as P(x) as follows:

$$P(x) = \begin{cases} \dfrac{e^{-\lambda_1(|x|-\mu_1)^2}}{\sum_{-\infty}^{0} e^{-\lambda_1(|x'|-\mu_1)^2} + \sum_{0}^{+\infty} e^{-\lambda_2(|x'|-\mu_2)^2}}, & x \leq 0, \\ \dfrac{e^{-\lambda_2(|x|-\mu_2)^2}}{\sum_{-\infty}^{0} e^{-\lambda_1(|x'|-\mu_1)^2} + \sum_{0}^{+\infty} e^{-\lambda_2(|x'|-\mu_2)^2}}, & x > 0, \end{cases} \quad (22)$$

wherein x is an amplitude corresponding to each of the constellation points along one of the first and second axes, |x| is the absolute value of x, x' denotes all x to be summed, $\lambda_1>0$, $\lambda_2>0$, $\mu_1>0$, $\mu_2>0$ and e is the Euler's number.

Supplementary Note 9

A communication system comprising:
a transmitting apparatus; and
a receiving apparatus, wherein
the transmitting apparatus includes:
a data processing device configured to obtain input information bits and generate a first output information bits and a second output information bits based on the input information bits;
a first digital-to-analog converter (DAC) configured to convert the first output information bits generated by the data processing device into a first analog signal;

a second DAC configured to convert the second output information bits generated by the data processing device into a second analog signal; and an in-phase quadrature (IQ) modulator configured to modulate the first and the second analog signals onto a first optical carrier signal generated by a first laser source to form a modulated optical carrier signal, wherein the first output information bits correspond to constellation points of a constellation diagram on a first axis and the second output information bits correspond to constellation points of the constellation diagram on a second axis, and a probability of the constellation points on at least one of the first or the second axis follows a distribution, the distribution having a plurality of local maxima, the receiving apparatus includes:

a mixer configured to mix a second optical carrier signal generated by a second laser source with the modulated optical carrier signal to obtain an optical demodulated signal;

a first photodetector configured to detect an amplitude of the optical demodulated signal to obtain a first analog demodulated signal;

a second photodetector configured to detect an amplitude of the optical demodulated signal to obtain a second analog demodulated signal;

a first analog-to-digital converter (ADC) configured to convert the first analog demodulated signal into a first digital demodulated signal;

a second ADC configured to convert the second analog demodulated signal into a second digital demodulated signal; and an inverse transformation processing device configured to transform the first and the second digital demodulated signals into the first and second output information bits.

Supplementary Note 10

The transmitting apparatus according to Supplementary Note 9, wherein
the distribution is described as P(x) as follows:

$$P(x) = \begin{cases} \dfrac{e^{-\lambda_1(|x|-\mu_1)^2}}{\sum_{-\infty}^{0} e^{-\lambda_1(|x'|-\mu_1)^2} + \sum_{0}^{+\infty} e^{-\lambda_2(|x'|-\mu_2)^2}}, & x \leq 0, \\ \dfrac{e^{-\lambda_2(|x|-\mu_2)^2}}{\sum_{-\infty}^{0} e^{-\lambda_1(|x'|-\mu_1)^2} + \sum_{0}^{+\infty} e^{-\lambda_2(|x'|-\mu_2)^2}}, & x > 0, \end{cases} \quad (23)$$

wherein x is an amplitude corresponding to each of the constellation points along one of the first and second axes, |x| is the absolute value of x, x' denotes all x to be summed, $\lambda_1 > 0$, $\lambda_2 > 0$, $\mu_1 > 0$, $\mu_2 > 0$ and e is the Euler's number.

Supplementary Note 11

A data processing method comprising:
obtaining input information bits; and
generating a first output information bits and a second output information bits based on the input information bits, wherein
the first output information bits correspond to constellation points of a constellation diagram on a first axis and the second output information bits correspond to constellation points of the constellation diagram on a second axis, and
a probability of the constellation points on at least one of the first or the second axis follows a distribution, the distribution having a plurality of local maxima.

Supplementary Note 12

A program for causing a computer to execute:
obtaining input information bits; and
generating a first output information bits and a second output information bits based on the input information bits, wherein
the first output information bits correspond to constellation points of a constellation diagram on a first axis and the second output information bits correspond to constellation points of the constellation diagram on a second axis, and
a probability of the constellation points on at least one of the first or the second axis follows a distribution, the distribution having a plurality of local maxima.

Various combinations and selections of various disclosed elements (including each element in each example, each element in each drawing, and the like) are possible within the scope of the claims of the present disclosure. That is, the present disclosure naturally includes various variations and modifications that could be made by those skilled in the art according to the overall disclosure including the claims and the technical concept.

What is claimed is:

1. A data processing device comprising:
at least one memory configured to store instructions;
at least one processor configured to execute the instructions to:
obtain input information bits from a carrier signal; and
generate first output information bits and a second output information bits using the input information bits,
wherein the first output information bits correspond to constellation points of a constellation diagram on a first axis and the second output information bits correspond to constellation points of the constellation diagram on a second axis, and
wherein a probability of the constellation points on at least one of the first or the second axis follows a distribution, the distribution having a plurality of local maxima;
at least one digital-to-analog converter (DAC) configured to convert the generated first output information bits and the second output information bits into at least one carrier signal; and
a transmitter configured to transmit the at least one carrier signal to another data processing device.

2. The data processing device according to claim 1, wherein the distribution is described as P(x) as follows:

$$P(x) = \begin{cases} \dfrac{e^{-\lambda_1(|x|-\mu_1)^2}}{\sum_{-\infty}^{0} e^{-\lambda_1(|x'|-\mu_1)^2} + \sum_{0}^{+\infty} e^{-\lambda_2(|x'|-\mu_2)^2}}, & x \leq 0, \\ \dfrac{e^{-\lambda_2(|x|-\mu_2)^2}}{\sum_{-\infty}^{0} e^{-\lambda_1(|x'|-\mu_1)^2} + \sum_{0}^{+\infty} e^{-\lambda_2(|x'|-\mu_2)^2}}, & x > 0, \end{cases} \quad (1)$$

and
  wherein x is an amplitude corresponding to each of the constellation points along one of the first and second axes, |x| is the absolute value of x, x' denotes all x to be summed, $\lambda_1 > 0$, $\lambda_2 > 0$, $\mu_1 > 0$, $\mu_2 > 0$ and e is the Euler's number.

3. The data processing device according to claim 1, wherein the distribution is described as P(x) as follows:

$$P(x) = \begin{cases} \dfrac{\sum e^{-\lambda_{1i}(|x|-\mu_{1i})^2}}{\sum\sum_{-\infty}^{0} e^{-\lambda'_{1i}(|x'_j|-\mu'_{1i})^2} + \sum\sum_{0}^{+\infty} e^{-\lambda'_{2i}(|x'_j|-\mu'_{2i})^2}}, & x \le 0, \\ \dfrac{\sum e^{-\lambda_{2i}(|x|-\mu_{2i})^2}}{\sum\sum_{-\infty}^{0} e^{-\lambda'_{1i}(|x'_j|-\mu'_{1i})^2} + \sum\sum_{0}^{+\infty} e^{-\lambda'_{2i}(|x'_j|-\mu'_{2i})^2}}, & x > 0, \end{cases} \quad (2)$$

and
  wherein x is an amplitude corresponding to each of the constellation points along one of the first and second axes, |x| is the absolute value of x, $x_j'$ denotes all x to be summed, $\lambda_{1i} > 0$, $\lambda_{2i} > 0$, $\mu_{1i} > 0$, $\mu_{2i} > 0$, e is the Euler's number and i and j are independently summed indices.

4. The data processing device according to claim 1, wherein the at least one processor is further configured to:
  generate a first pair of the first output information bits and the second output information bits and a second pair of a third output information bits and a fourth output information bits using the input information bits, and wherein:
    the first output information bits correspond to constellation points of a constellation diagram on a first axis in a first polarization direction and the second output information bits correspond to constellation points of the constellation diagram on a second axis in the first polarization direction,
    the third output information bits correspond to constellation points of a constellation diagram on a first axis in a second polarization direction and the fourth output information bits correspond to constellation points of the constellation diagram on a second axis in the second polarization direction,
    a probability of the constellation points on at least one of the first or the second axis in the first polarization direction follows a first distribution, the first distribution having a plurality of local maxima, and
    a probability of the constellation points on at least one of the first or the second axis in the second polarization direction follows a second distribution, the second distribution having a plurality of local maxima.

5. The data processing device according to claim 4, wherein the first distribution is described as P(x) as follows:

$$P(x) = \begin{cases} \dfrac{e^{-\lambda_{\alpha 1}(|x|-\mu_{\alpha 1})^2}}{\sum_{-\infty}^{0} e^{-\lambda_{\alpha 1}(|x'|-\mu_{\alpha 1})^2} + \sum_{0}^{+\infty} e^{-\lambda_{\alpha 2}(|x'|-\mu_{\alpha 2})^2}}, & x \le 0, \\ \dfrac{e^{-\lambda_{\alpha 2}(|x|-\mu_{\alpha 2})^2}}{\sum_{-\infty}^{0} e^{-\lambda_{\alpha 1}(|x'|-\mu_{\alpha 1})^2} + \sum_{0}^{+\infty} e^{-\lambda_{\alpha 2}(|x'|-\mu_{\alpha 2})^2}}, & x > 0, \end{cases} \quad (3)$$

wherein x is an amplitude corresponding to each of the constellation points along one of the first and second axes in the first polarization direction, |x| is the absolute value of x, x' denotes all x to be summed, $\lambda_{\alpha 1} > 0$, $\lambda_{\alpha 2} > 0$, $\mu_{\alpha 1} > 0$, $\mu_{\alpha 2} > 0$ and e is the Euler's number, wherein the second distribution is described as P(y) as follows:

$$P(y) = \begin{cases} \dfrac{e^{-\lambda_{\beta 1}(|y|-\mu_{\beta 1})^2}}{\sum_{-\infty}^{0} e^{-\lambda_{\beta 1}(|y'|-\mu_{\beta 1})^2} + \sum_{0}^{+\infty} e^{-\lambda_{\beta 2}(|y'|-\mu_{\beta 2})^2}}, & y \le 0, \\ \dfrac{e^{-\lambda_{\beta 2}(|y|-\mu_{\beta 2})^2}}{\sum_{-\infty}^{0} e^{-\lambda_{\beta 1}(|y'|-\mu_{\beta 1})^2} + \sum_{0}^{+\infty} e^{-\lambda_{\beta 2}(|y'|-\mu_{\beta 2})^2}}, & y > 0, \end{cases} \quad (4)$$

and
  wherein y is an amplitude corresponding to each of the constellation points along one of the first and second axes in the second polarization direction, |y| is the absolute value of y, y' denotes all y to be summed, $\lambda_{\beta 1} > 0$, $\lambda_{\beta 2} > 0$, $\mu_{\beta 1} > 0$, $\mu_{\beta 2} > 0$ and e is the Euler's number.

6. The data processing device according to claim 4, wherein the first distribution is described as P(x) as follows:

$$P(x) = \begin{cases} \dfrac{\sum e^{-\lambda_{\alpha 1i}(|x|-\mu_{\alpha 1i})^2}}{\sum\sum_{-\infty}^{0} e^{-\lambda'_{\alpha 1i}(|x'_j|-\mu'_{\alpha 1i})^2} + \sum\sum_{0}^{+\infty} e^{-\lambda'_{\alpha 2i}(|x'_j|-\mu'_{\alpha 2i})^2}}, & x \le 0, \\ \dfrac{\sum e^{-\lambda_{\alpha 2i}(|x|-\mu_{\alpha 2i})^2}}{\sum\sum_{-\infty}^{0} e^{-\lambda'_{\alpha 1i}(|x'_j|-\mu'_{\alpha 1i})^2} + \sum\sum_{0}^{+\infty} e^{-\lambda'_{\alpha 2i}(|x'_j|-\mu'_{\alpha 2i})^2}}, & x > 0, \end{cases} \quad (5)$$

wherein x is an amplitude corresponding to each of the constellation points along one of the first and second axes in the first polarization direction, |x| is the absolute value of x, $x_j'$ denotes all x to be summed, $\lambda_{\alpha 1i} > 0$, $\lambda_{\alpha 2i} > 0$, $\mu_{\alpha 1i} > 0$, $\mu_{\alpha 2i} > 0$, e is the Euler's number and i and j are independently summed indices, wherein the second distribution is described as P(y) as follows:

$$P(y) = \begin{cases} \dfrac{\sum e^{-\lambda_{\beta 1i}(|y|-\mu_{\beta 1i})^2}}{\sum\sum_{-\infty}^{0} e^{-\lambda'_{\beta 1i}(|y'_j|-\mu'_{\beta 1i})^2} + \sum\sum_{0}^{+\infty} e^{-\lambda'_{\beta 2i}(|y'_j|-\mu'_{\beta 2i})^2}}, & y \le 0, \\ \dfrac{\sum e^{-\lambda_{\beta 2i}(|y|-\mu_{\beta 2i})^2}}{\sum\sum_{-\infty}^{0} e^{-\lambda'_{\beta 1i}(|y'_j|-\mu'_{\beta 1i})^2} + \sum\sum_{0}^{+\infty} e^{-\lambda'_{\beta 2i}(|y'_j|-\mu'_{\beta 2i})^2}}, & y > 0, \end{cases} \quad (6)$$

and
  wherein y is an amplitude corresponding to each of the constellation points along one of the first and second axes in the second polarization direction, |y| is the absolute value of y, $y_j'$ denotes all y to be summed, $\lambda_{\beta 1i} > 0$, $\lambda_{\beta 2i} > 0$, $\mu_{\beta 1i} > 0$, $\mu_{\beta 2i} > 0$, e is the Euler's number and i and j are independently summed indices.

7. The data processing device according to claim 1, further comprising:
  a first digital-to-analog converter (DAC) configured to convert the first output information bits generated by the data processing device into a first analog signal;
  a second DAC configured to convert the second output information bits generated by the data processing device into a second analog signal; and
  an in-phase quadrature (IQ) modulator configured to modulate the first and the second analog signals onto an optical carrier signal generated by a laser source to form a modulated optical carrier signal.

8. The data processing device according to claim 1, wherein none of the plurality of local maxima are in a center of the distribution.

9. A data processing method comprising:
    obtaining, by at least one processor, input information bits from a carrier signal;
    generating, by the at least one processor, first output information bits and a-second output information bits using the input information bits, wherein:
        the first output information bits correspond to constellation points of a constellation diagram on a first axis and the second output information bits correspond to constellation points of the constellation diagram on a second axis, and
        a probability of the constellation points on at least one of the first or the second axis follows a distribution, the distribution having a plurality of local maxima,
    converting, by at least one digital-to-analog converter (DAC), the generated first output information bits and the second output information bits into at least one carrier signal; and
    transmitting, by a transmitter, the at least one carrier signal to another data processing device.

10. The data processing method according to claim 9, wherein none of the plurality of local maxima are in a center of the distribution.

11. A non-transitory computer readable medium storing a program for causing a computer to execute:
    obtaining, by at least one processor, input information bits from a carrier signal;
    generating, by the at least one processor, first output information bits and a second output information bits using the input information bits, wherein:
        the first output information bits correspond to constellation points of a constellation diagram on a first axis and the second output information bits correspond to constellation points of the constellation diagram on a second axis, and
        a probability of the constellation points on at least one of the first or the second axis follows a distribution, the distribution having a plurality of local maxima;
    converting, by at least one digital-to-analog converter (DAC), the generated first output information bits and the second output information bits into at least one carrier signal; and
    transmitting, by a transmitter, the at least one carrier signal to another data processing device.

12. The non-transitory computer readable medium according to claim 11, wherein none of the plurality of local maxima are in a center of the distribution.

* * * * *